(12) United States Patent
Kumnick

(10) Patent No.: US 12,294,630 B2
(45) Date of Patent: *May 6, 2025

(54) SYSTEM AND METHOD FOR TOKEN DOMAIN CONTROL

(71) Applicant: Visa International Service Association, San Francisco, CA (US)

(72) Inventor: Phillip Kumnick, Phoenix, AZ (US)

(73) Assignee: Visa International Service Association, San Francisco, CA (US)

(*) Notice: Subject to any disclaimer, the term of this patent is extended or adjusted under 35 U.S.C. 154(b) by 703 days.

This patent is subject to a terminal disclaimer.

(21) Appl. No.: 17/398,955

(22) Filed: Aug. 10, 2021

(65) Prior Publication Data

US 2021/0368012 A1 Nov. 25, 2021

Related U.S. Application Data

(63) Continuation of application No. 15/806,947, filed on Nov. 8, 2017, now Pat. No. 11,122,133, which is a (Continued)

(51) Int. Cl.
*H04L 67/53* (2022.01)
*G06Q 20/38* (2012.01)
(Continued)

(52) U.S. Cl.
CPC ........... *H04L 67/53* (2022.05); *G06Q 20/385* (2013.01); *G06Q 20/4016* (2013.01);
(Continued)

(58) Field of Classification Search
CPC ....... H04L 67/53; H04L 63/083; H04L 67/02; H04L 67/10; H04L 9/3213; G06Q 20/385; G06Q 20/4016
See application file for complete search history.

(56) References Cited

U.S. PATENT DOCUMENTS 5,613,012 A 3/1997 Hoffman et al.
5,781,438 A 7/1998 Lee et al.
(Continued)

FOREIGN PATENT DOCUMENTS

CN 101014958 8/2007
CN 101336436 A 12/2008
(Continued)

OTHER PUBLICATIONS

Application No. CN201911281926.1, Notice of Decision to Grant, Mailed On Jul. 31, 2023, 4 pages.
(Continued)

*Primary Examiner* — Fatoumata Traore
*Assistant Examiner* — Carlton Johnson
(74) *Attorney, Agent, or Firm* — Kilpatrick Townsend & Stockton LLP

(57) ABSTRACT

A method for providing a token code in conjunction with a value token is disclosed. The token code serves as a shared secret for authenticating the use of the value token. Multiple token holders can possess the same value token, but each token holder may have a different token code for use with the value token.

20 Claims, 8 Drawing Sheets

Related U.S. Application Data continuation of application No. 14/704,571, filed on May 5, 2015, now Pat. No. 9,848,052.

(60) Provisional application No. 61/988,815, filed on May 5, 2014.

(51) Int. Cl.
*G06Q 20/40* (2012.01)
*H04L 9/40* (2022.01)
*H04L 67/02* (2022.01)
*H04L 67/10* (2022.01)

(52) U.S. Cl.
CPC ............ *H04L 63/083* (2013.01); *H04L 67/02* (2013.01); *H04L 67/10* (2013.01)

(56) References Cited

U.S. PATENT DOCUMENTS

| | | |
|---|---|---|
| 5,883,810 A | 3/1999 | Franklin et al. |
| 5,953,710 A | 9/1999 | Fleming |
| 5,956,699 A | 9/1999 | Wong et al. |
| 6,000,832 A | 12/1999 | Franklin et al. |
| 6,014,635 A | 1/2000 | Harris et al. |
| 6,044,360 A | 3/2000 | Picciallo |
| 6,163,771 A | 12/2000 | Walker et al. |
| 6,227,447 B1 | 5/2001 | Campisano |
| 6,236,981 B1 | 5/2001 | Hill |
| 6,267,292 B1 | 7/2001 | Walker et al. |
| 6,327,578 B1 | 12/2001 | Linehan |
| 6,341,724 B2 | 1/2002 | Campisano |
| 6,385,596 B1 | 5/2002 | Wiser et al. |
| 6,422,462 B1 | 7/2002 | Cohen |
| 6,425,523 B1 | 7/2002 | Shem-Ur et al. |
| 6,592,044 B1 | 7/2003 | Wong et al. |
| 6,636,833 B1 | 10/2003 | Flitcroft et al. |
| 6,748,367 B1 | 6/2004 | Lee |
| 6,805,287 B2 | 10/2004 | Bishop et al. |
| 6,879,965 B2 | 4/2005 | Fung et al. |
| 6,891,953 B1 | 5/2005 | DeMello et al. |
| 6,901,387 B2 | 5/2005 | Wells et al. |
| 6,931,382 B2 | 8/2005 | Laage et al. |
| 6,938,019 B1 | 8/2005 | Uzo |
| 6,941,285 B2 | 9/2005 | Sarcanin |
| 6,968,372 B1 | 11/2005 | Thompson et al. |
| 6,980,670 B1 | 12/2005 | Hoffman et al. |
| 6,990,470 B2 | 1/2006 | Hogan et al. |
| 6,991,157 B2 | 1/2006 | Bishop et al. |
| 7,051,929 B2 | 5/2006 | Li |
| 7,069,249 B2 | 6/2006 | Stolfo et al. |
| 7,103,576 B2 | 9/2006 | Mann, III et al. |
| 7,113,930 B2 | 9/2006 | Eccles et al. |
| 7,136,835 B1 | 11/2006 | Flitcroft et al. |
| 7,177,835 B1 | 2/2007 | Walker et al. |
| 7,177,848 B2 | 2/2007 | Hogan et al. |
| 7,194,437 B1 | 3/2007 | Britto et al. |
| 7,209,561 B1 | 4/2007 | Shankar et al. |
| 7,264,154 B2 | 9/2007 | Harris |
| 7,287,692 B1 | 10/2007 | Patel et al. |
| 7,292,999 B2 | 11/2007 | Hobson et al. |
| 7,350,230 B2 | 3/2008 | Forrest |
| 7,353,382 B2 | 4/2008 | Labrou et al. |
| 7,379,919 B2 | 5/2008 | Hogan et al. |
| RE40,444 E | 7/2008 | Linehan |
| 7,415,443 B2 | 8/2008 | Hobson et al. |
| 7,444,676 B1 | 10/2008 | Asghari-Kamrani et al. |
| 7,469,151 B2 | 12/2008 | Khan et al. |
| 7,548,889 B2 | 6/2009 | Bhambri et al. |
| 7,567,934 B2 | 7/2009 | Flitcroft et al. |
| 7,567,936 B1 | 7/2009 | Peckover et al. |
| 7,571,139 B1 | 8/2009 | Giordano et al. |
| 7,571,142 B1 | 8/2009 | Flitcroft et al. |
| 7,580,898 B2 | 8/2009 | Brown et al. |
| 7,584,153 B2 | 9/2009 | Brown et al. |
| 7,593,896 B1 | 9/2009 | Flitcroft et al. |
| 7,606,560 B2 | 10/2009 | Labrou et al. |
| 7,627,531 B2 | 12/2009 | Breck et al. |
| 7,627,895 B2 | 12/2009 | Gifford et al. |
| 7,650,314 B1 | 1/2010 | Saunders |
| 7,685,037 B2 | 3/2010 | Reiners et al. |
| 7,702,578 B2 | 4/2010 | Fung et al. |
| 7,707,120 B2 | 4/2010 | Dominguez et al. |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II et al. |
| 7,784,685 B1 | 8/2010 | Hopkins, III |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,818,264 B2 | 10/2010 | Hammad |
| 7,828,220 B2 | 11/2010 | Mullen |
| 7,835,960 B2 | 11/2010 | Breck et al. |
| 7,841,523 B2 | 11/2010 | Oder, II et al. |
| 7,841,539 B2 | 11/2010 | Hewton |
| 7,844,550 B2 | 11/2010 | Walker et al. |
| 7,848,980 B2 | 12/2010 | Carlson |
| 7,849,020 B2 | 12/2010 | Johnson |
| 7,853,529 B1 | 12/2010 | Walker et al. |
| 7,853,995 B2 | 12/2010 | Chow et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,890,393 B2 | 2/2011 | Talbert et al. |
| 7,891,563 B2 | 2/2011 | Oder, II et al. |
| 7,896,238 B2 | 3/2011 | Fein et al. |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein et al. |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders et al. |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen et al. |
| 8,095,113 B2 | 1/2012 | Kean et al. |
| 8,104,679 B2 | 1/2012 | Brown |
| RE43,157 E | 2/2012 | Bishop et al. |
| 8,109,436 B1 | 2/2012 | Hopkins, III |
| 8,121,942 B2 | 2/2012 | Carlson et al. |
| 8,121,956 B2 | 2/2012 | Carlson et al. |
| 8,126,449 B2 | 2/2012 | Beenau et al. |
| 8,171,525 B1 | 5/2012 | Pelly et al. |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza et al. |
| 8,219,489 B2 | 7/2012 | Patterson |
| 8,224,702 B2 | 7/2012 | Mengerink et al. |
| 8,225,385 B2 | 7/2012 | Chow et al. |
| 8,229,852 B2 | 7/2012 | Carlson |
| 8,265,993 B2 | 9/2012 | Chien et al. |
| 8,280,777 B2 | 10/2012 | Mengerink et al. |
| 8,281,991 B2 | 10/2012 | Wentker et al. |
| 8,328,095 B2 | 12/2012 | Oder, II et al. |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren |

(56) References Cited

U.S. PATENT DOCUMENTS

| | | |
|---|---|---|
| 8,433,116 B2 | 4/2013 | Butler et al. |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,484,134 B2 | 7/2013 | Hobson et al. |
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,528,067 B2 | 9/2013 | Hurry et al. |
| 8,533,860 B1 | 9/2013 | Grecia |
| 8,538,845 B2 | 9/2013 | Liberty |
| 8,555,079 B2 | 10/2013 | Shablygin et al. |
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | McGuire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | von Behren et al. |
| 8,651,374 B2 | 2/2014 | Brabson et al. |
| 8,656,180 B2 | 2/2014 | Shablygin et al. |
| 8,682,802 B1 | 3/2014 | Kannanari |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,195,984 B1 | 11/2015 | Spector et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,652,769 B1* | 5/2017 | Golin ............... G06Q 20/38215 |
| 9,680,942 B2 | 6/2017 | Dimmick |
| 9,848,052 B2 | 12/2017 | Kumnick |
| 2001/0029485 A1 | 10/2001 | Brody et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0073045 A1 | 6/2002 | Rubin et al. |
| 2002/0116341 A1 | 8/2002 | Hogan et al. |
| 2002/0133467 A1 | 9/2002 | Hobson et al. |
| 2002/0147913 A1 | 10/2002 | Lun Yip |
| 2003/0028481 A1 | 2/2003 | Flitcroft et al. |
| 2003/0130955 A1 | 7/2003 | Hawthorne |
| 2003/0191709 A1 | 10/2003 | Elston et al. |
| 2003/0191945 A1 | 10/2003 | Keech |
| 2004/0010462 A1 | 1/2004 | Moon et al. |
| 2004/0050928 A1 | 3/2004 | Bishop et al. |
| 2004/0059682 A1 | 3/2004 | Hasumi et al. |
| 2004/0093281 A1 | 5/2004 | Silverstein et al. |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0260646 A1 | 12/2004 | Berardi et al. |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2006/0235795 A1 | 10/2006 | Johnson et al. |
| 2006/0237528 A1 | 10/2006 | Bishop et al. |
| 2006/0278704 A1 | 12/2006 | Saunders et al. |
| 2007/0107044 A1 | 5/2007 | Yuen et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0288377 A1 | 12/2007 | Shaked |
| 2007/0291995 A1 | 12/2007 | Rivera |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0072301 A1* | 3/2008 | Chia ................. H04L 63/0815 726/8 |
| 2008/0178274 A1 | 7/2008 | Nakhjiri et al. |
| 2008/0201264 A1 | 8/2008 | Brown et al. |
| 2008/0201265 A1 | 8/2008 | Hewton |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0283591 A1 | 11/2008 | Oder, II et al. |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048971 A1 | 2/2009 | Hathaway et al. |
| 2009/0106112 A1 | 4/2009 | Dalmia et al. |
| 2009/0106160 A1 | 4/2009 | Skowronek |
| 2009/0119764 A1* | 5/2009 | Applewhite ........ H04L 63/0853 726/9 |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |
| 2010/0008535 A1 | 1/2010 | Abulafia et al. |

(56) References Cited

U.S. PATENT DOCUMENTS

| | | |
|---|---|---|
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru et al. |
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0291904 A1 | 11/2010 | Musfeldt et al. |
| 2010/0299267 A1 | 11/2010 | Faith et al. |
| 2010/0306076 A1 | 12/2010 | Taveau et al. |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0040640 A1 | 2/2011 | Erikson |
| 2011/0047076 A1 | 2/2011 | Carlson et al. |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0099384 A1* | 4/2011 | Grange .............. H04L 9/3234 713/184 |
| 2011/0125597 A1 | 5/2011 | Oder, II et al. |
| 2011/0153437 A1 | 6/2011 | Archer et al. |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0208600 A1 | 8/2011 | Aharoni et al. |
| 2011/0238511 A1 | 9/2011 | Park et al. |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0084804 A1* | 4/2012 | Simmons ............. H04N 21/235 725/28 |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0143767 A1 | 6/2012 | Abadir |
| 2012/0143772 A1 | 6/2012 | Abadir |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0259782 A1 | 10/2012 | Hammad |
| 2012/0265631 A1 | 10/2012 | Cronic et al. |
| 2012/0271770 A1 | 10/2012 | Harris et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0018757 A1 | 1/2013 | Anderson et al. |
| 2013/0019098 A1 | 1/2013 | Gupta et al. |
| 2013/0031006 A1 | 1/2013 | McCullagh et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder ("J.D."), II et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0211934 A1* | 8/2013 | Balasubramanian .. G06Q 30/04 705/16 |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | von Mueller et al. |
| 2013/0262296 A1 | 10/2013 | Thomas et al. |

(56) References Cited

U.S. PATENT DOCUMENTS

| | | |
|---|---|---|
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0268776 A1 | 10/2013 | Motoyama |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0297501 A1 | 11/2013 | Monk et al. |
| 2013/0297504 A1 | 11/2013 | Nwokolo et al. |
| 2013/0297508 A1 | 11/2013 | Belamant |
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0032419 A1 | 1/2014 | Anderson et al. |
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040148 A1 | 2/2014 | Ozvat et al. |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0074724 A1 | 3/2014 | Gordon et al. |
| 2014/0108172 A1 | 4/2014 | Weber et al. |
| 2014/0108260 A1 | 4/2014 | Poole et al. |
| 2014/0108265 A1 | 4/2014 | Hayhow et al. |
| 2014/0114857 A1 | 4/2014 | Griggs et al. |
| 2014/0122331 A1 | 5/2014 | Vaish et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0249945 A1 | 9/2014 | Gauthier et al. |
| 2014/0294701 A1 | 10/2014 | Dai et al. |
| 2014/0297534 A1 | 10/2014 | Patterson |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0278799 A1 | 10/2015 | Palanisamy |
| 2015/0287037 A1 | 10/2015 | Salmon et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0339664 A1 | 11/2015 | Wong et al. |
| 2015/0356560 A1 | 12/2015 | Shastry et al. |
| 2015/0363781 A1 | 12/2015 | Badenhorst |
| 2016/0028550 A1 | 1/2016 | Gaddam et al. |
| 2016/0036790 A1 | 2/2016 | Shastry et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0092874 A1 | 3/2016 | O'Regan et al. |
| 2016/0103675 A1 | 4/2016 | Aabye et al. |
| 2016/0119296 A1 | 4/2016 | Laxminarayanan et al. |
| 2016/0132878 A1 | 5/2016 | O'Regan et al. |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0197725 A1 | 7/2016 | Hammad |
| 2016/0224976 A1 | 8/2016 | Basu et al. |
| 2016/0308995 A1 | 10/2016 | Youdale et al. |
| 2017/0046696 A1 | 2/2017 | Powell et al. |
| 2017/0103387 A1 | 4/2017 | Weber |
| 2017/0186001 A1 | 6/2017 | Reed et al. |
| 2017/0220818 A1 | 8/2017 | Nagasundaram et al. |
| 2017/0228723 A1 | 8/2017 | Taylor et al. |
| 2017/0295155 A1 | 10/2017 | Wong |
| 2017/0364903 A1 | 12/2017 | Lopez |
| 2018/0069936 A1 | 3/2018 | Kumnick |

FOREIGN PATENT DOCUMENTS

| | | |
|---|---|---|
| CN | 102754116 | 10/2012 |
| CN | 103270524 | 8/2013 |
| CN | 103282923 A | 9/2013 |
| CN | 103765454 A | 4/2014 |
| CN | 106462849 | 2/2017 |
| EP | 2156397 | 2/2010 |
| EP | 15789444.5 | 3/2017 |
| KR | 16146784 | 12/2016 |
| SG | 11201609216 Y | 4/2018 |
| WO | 0135304 | 5/2001 |
| WO | 01035304 | 5/2001 |
| WO | 2004042536 | 5/2004 |
| WO | 2006113834 | 10/2006 |
| WO | 2009032523 | 3/2009 |
| WO | 2010078522 | 7/2010 |
| WO | 2012068078 | 5/2012 |
| WO | 2012098556 | 7/2012 |
| WO | 2012142370 | 10/2012 |
| WO | 2012167941 | 12/2012 |
| WO | 2013048538 | 4/2013 |
| WO | 2013056104 | 4/2013 |
| WO | 2013119914 | 8/2013 |
| WO | 2013179271 | 12/2013 |

(56) References Cited

FOREIGN PATENT DOCUMENTS

| WO | 2015171625 | 11/2015 |
|---|---|---|
| WO | 2015179637 | 11/2015 |

OTHER PUBLICATIONS

AU2021286293 , "Notice of Acceptance", Apr. 26, 2023, 3 pages.
AU2020256366 , "Notice of Acceptance", Sep. 7, 2021, 3 pages.
AU2021286293 , "First Examination Report", Jan. 10, 2023, 2 pages.
"Payment Tokenisation Specification Technical Framework", Version 1.0, EMVCo, Available online at: https://media.scmagazine.com/documents/95/emvco_payment_tokenisation_spe_23619.pdf, Mar. 31, 2014, 84 pages.
"Petition for Inter Partes Review of U.S. Pat. No. 8,533,860 Challenging Claims 1-30 Under 35 U.S.C. § 312 and 37 C.F.R. § 42.104", USPTO Patent Trial and Appeal Board, IPR 2016-00600, Feb. 17, 2016, 65 pages.
U.S. Appl. No. 14/600,523 , "U.S. Patent Application No.", Secure Payment Processing Using Authorization Request, filed Jan. 20, 2015, 42 pages.
U.S. Appl. No. 14/704,571 , "Final office Action", Apr. 21, 2017, 42 Pages.
U.S. Appl. No. 14/704,571 , Non-Final Office Action, Mailed On Sep. 12, 2016, 34 pages.
U.S. Appl. No. 14/704,571 , Notice of Allowance, Mailed On Oct. 12, 2017, 15 pages.
U.S. Appl. No. 14/719,014 , "Restriction Requirement", May 26, 2016, 6 pages.
U.S. Appl. No. 14/952,444 , "U.S. Patent Application No.", Tokenization Request via Access Device, filed Nov. 25, 2015, 78 pages.
U.S. Appl. No. 14/952,514 , "U.S. Patent Application No.", Systems Communications With Non-Sensitive Identifiers, filed Nov. 25, 2015, 72 pages.
U.S. Appl. No. 14/955,716 , "U.S. Patent Application No.", Provisioning Platform for Machine-To-Machine Devices, filed Dec. 1, 2015, 61 pages.
U.S. Appl. No. 14/966,948 , "U.S. Patent Application No.", Automated Access Data Provisioning, filed Dec. 11, 2015, 52 pages.
U.S. Appl. No. 15/004,705 , "U.S. Patent Application No.", Cloud-Based Transactions With Magnetic Secure Transmission, filed Jan. 22, 2016, 161 pages.
U.S. Appl. No. 15/008,388 , "U.S. Patent Application No.", Methods for Secure Credential Provisioning, filed Jan. 27, 2016, 90 pages.
U.S. Appl. No. 15/011,366 , "U.S. Patent Application No.", Token Check Offline, filed Jan. 29, 2016, 60 pages.
U.S. Appl. No. 15/019,157 , "U.S. Patent Application No.", Token Processing Utilizing Multiple Authorizations, filed Feb. 9, 2016, 62 pages.
U.S. Appl. No. 15/041,495 , "U.S. Patent Application No.", Peer Forward Authorization of Digital Requests, filed Feb. 11, 2016, 63 pages.
U.S. Appl. No. 15/265,282 , "U.S. Patent Application No.", Self-Cleaning Token Valut, filed Sep. 14, 2016, 52 pages.
U.S. Appl. No. 15/462,658 , "U.S. Patent Application No.", Replacing Token on a Multi-Token User Device, filed Mar. 17, 2017, 58 pages.
U.S. Appl. No. 15/585,077 , "U.S. Patent Application No.", System and Method Using Interaction Token, filed May 2, 2017, 36 pages.
U.S. Appl. No. 15/806,947 , Final Office Action, Mailed On Jul. 24, 2020, 25 pages.
U.S. Appl. No. 15/806,947 , Non-Final Office Action, Mailed On Dec. 12, 2019, 24 pages.
U.S. Appl. No. 15/806,947 , Non-Final Office Action, Mailed On Mar. 17, 2021, 26 pages.
U.S. Appl. No. 15/806,947 , Notice of Allowance, Mailed On Jun. 30, 2021, 9 pages.
U.S. Appl. No. 61/738,832 , "U.S. Provisional Application No.", Management of Sensitive Data, filed Dec. 18, 2012, 22 pages.
U.S. Appl. No. 61/751,763 , "U.S. Provisional Application No.", Payments Bridge, filed Jan. 11, 2013, 64 pages.
U.S. Appl. No. 61/879,632 , "U.S. Provisional Application No.", Systems and Methods for Managing Mobile Cardholder Verification Methods, filed Sep. 18, 2013, 24 pages.
U.S. Appl. No. 61/892,407 , "U.S. Provisional Application No.", Issuer Over-The-Air Update Method and System, filed Oct. 17, 2013, 28 pages.
U.S. Appl. No. 61/894,749 , "U.S. Provisional Application No.", Methods and Systems for Authentication and Issuance of Tokens in a Secure Environment, filed Oct. 23, 2013, 67 pages.
U.S. Appl. No. 61/926,236 , "U.S. Provisional Application No.", Methods and Systems for Provisioning Mobile Devices With Payment Credentials and Payment Token Identifiers, filed Jan. 10, 2014, 51 pages.
U.S. Appl. No. 62/000,288 , "U.S. Provisional Application No.", Payment System Canonical Address Format, filed May 19, 2014, 58 pages.
U.S. Appl. No. 62/003,717 , "U.S. Provisional Application No.", Mobile Merchant Application, filed May 28, 2014, 58 pages.
U.S. Appl. No. 62/024,426 , "U.S. Provisional Application No.", Secure Transactions Using Mobile Devices, filed Jul. 14, 2014, 102 pages.
U.S. Appl. No. 62/037,033 , "U.S. Provisional Application No.", Sharing Payment Token, filed Aug. 13, 2014, 36 pages.
U.S. Appl. No. 62/038,174 , "U.S. Provisional Application No.", Customized Payment Gateway, filed Aug. 15, 2014, 42 pages.
U.S. Appl. No. 62/042,050 , "U.S. Provisional Application No.", Payment Device Authentication and Authorization System, filed Aug. 26, 2014, 120 pages.
U.S. Appl. No. 62/053,736 , "U.S. Provisional Application No.", Completing Transactions Without a User Payment Device, filed Sep. 22, 2014, 31 pages.
U.S. Appl. No. 62/054,346 , "U.S. Provisional Application No.", Mirrored Token Vault, filed Sep. 23, 2014, 38 pages.
U.S. Appl. No. 62/103,522 , "U.S. Provisional Application No.", Methods and Systems for Wallet Provider Provisioning, filed Jan. 14, 2015, 39 pages.
U.S. Appl. No. 62/108,403 , "U.S. Provisional Application No.", Wearables With NFC HCE, filed Jan. 27, 2015, 32 pages.
U.S. Appl. No. 62/117,291 , "U.S. Provisional Application No.", Token and Cryptogram Using Transaction Specific Information, filed Feb. 17, 2015, 25 pages.
U.S. Appl. No. 62/128,709 , "U.S. Provisional Application No.", Tokenizing Transaction Amounts, filed Mar. 5, 2015, 30 pages.
AU2015256205 , "First Examination Report", Jan. 28, 2020, 3 pages.
AU2020256366 , "First Examination Report", Jul. 2, 2021, 3 pages.
Application No. CN201580023408.3 , Notice of Decision to Grant, Mailed On Sep. 29, 2019, 4 pages.
Application No. CN201580023408.3 , Office Action, Mailed On Feb. 2, 2019, 19 pages.
Application No. CN201580023408.3 , Office Action, Mailed On Jul. 29, 2019, 5 pages.
Application No. EP15789444.5 , Extended European Search Report, Mailed On Nov. 20, 2017, 11 pages.
Application No. EP15789444.5 , Office Action, Mailed On Jan. 28, 2020, 14 pages.
EP15789444.5 , "Summons to Attend Oral Proceedings", Jul. 3, 2020, 13 pages.
Application No. PCT/US2015/029267 , International Preliminary Report on Patentability, Mailed On Nov. 17, 2016, 9 pages.
Application No. PCT/US2015/029267 , International Search Report and Written Opinion, Mailed On Jul. 23, 2015, 10 pages.
Application No. PCT/US2015/031968 , International Search Report and Written Opinion, Mailed On Jul. 27, 2015, 7 pages.
Application No. SG10201803024S , Notice of Decision to Grant, Mailed On Jun. 19, 2020, 4 pages.
Application No. SG11201609216Y , Notice of Decision to Grant, Mailed On Feb. 22, 2018, 5 pages.

(56) References Cited

OTHER PUBLICATIONS

Application No. SG11201609216Y , Written Opinion, Mailed On Dec. 13, 2017, 7 pages.
Application No. CN201911281926.1 , Office Action, Mailed On Mar. 9, 2023, 13 pages.
Application No. SG10202007850W , Further Written Opinion, Mailed On Apr. 20, 2023, 5 pages.
"Payment Tokenisation Specification Technical Framework", EMV Co, Technical Framework, Version 1.0, Available online at: https://www.emvco.com/specifications.aspx?id=263, Mar. 2014, 84 pages.
Application No. SG10202007850W , Written Opinion, Mailed On Sep. 7, 2021, 9 pages.
Application No. SG10202007850W, Notice of Decision to Grant, Mailed On Nov. 18, 2024, 4 pages.

\* cited by examiner

SYSTEM AND METHOD FOR TOKEN DOMAIN CONTROL

CROSS REFERENCE TO RELATED APPLICATIONS

This application is a continuation of U.S. patent application Ser. No. 15/806,947, filed Nov. 8, 2017, which is a continuation of U.S. patent application Ser. No. 14/704,571, filed Jul. 22, 2015, which is a non-provisional application of and claims the benefit of the filing date of U.S. Provisional Application No. 61/988,815, filed on May 5, 2014, which is herein incorporated by reference in its entirety for all purposes.

BACKGROUND

Current implementations of token systems could be improved. For example, in some cases, there may be an insufficient amount of possible unique token values. This may be an issue when multiple tokens are issued for one user account. A unique token may be issued for each domain in which the payment account is used, and tokens may be regularly refreshed (e.g., one-time use tokens). Current token formats only allow a certain amount of variation, so eventually all possible unique values may be exhausted.

Another issue is that users have historically been recognized by various entities through their primary account numbers. User activity tracking, loyalty programs, activity analysis, and other programs have been based on PAN usage. When the PAN is replaced with multiple tokens, each token may appear to be a different account to certain entities (e.g., acquirers), and thus these entities may not be able to determine the total activity for a given account. Accordingly, using tokens instead of primary account numbers can be disruptive.

Embodiments of the invention address these and other problems, individually and collectively.

SUMMARY

One embodiment of the invention is directed to a method. The method comprises receiving, by a data processor in a token service computer, a first token request from a first token requestor computer, the first token request including a value credential and a first domain identifier. The method also comprises identifying a value token associated with the value credential, generating a first token code associated with the value token, assigning the value token and the first token code to the first domain identifier, and transmitting the value token and the first token code to the first token requestor computer. The first token requestor subsequently uses the value token for an interaction, and the first token requestor's subsequent use of the value token is valid if the value token is accompanied by the first token code.

In another embodiment, the method further comprises receiving a second token request from a second token requestor computer, the second token request including the value credential and a second domain identifier. The method also comprises identifying the value token associated with the value credential generating a second token code associated with the value token assigning the value token and the second token code to the second domain identifier, and transmitting the value token and the second token code to the second token requestor computer. The second token requestor subsequently uses the value token for an interaction, and the second token requestor's subsequent use of the value token is valid if the value token is accompanied by the second token code.

Another embodiment of the invention is directed to a token service computer configured to perform the above-described method.

Another embodiment of the invention is directed to a method comprising receiving, by a token service system, a first authorization request message including a value token, a first token code, and a first domain identifier. The method also comprises determining that the first token code is associated with the value token, determining that the value token and the first token code are assigned to the first domain identifier, identifying a value credential associated with the value token, adding the value credential to the first authorization request message, sending the first authorization request message to an authorizing entity computer, receiving a first authorization response message including the value credential from the authorizing entity computer, replacing the value credential with the value token and the first token code in the first authorization response message, and forwarding the first authorization response message.

In another embodiment, the method further comprises receiving, by the token service system, a second authorization request message including a value token, a second token code, and a second domain identifier. The method also comprises determining that the second token code is associated with the value token, determining that the value token and the second token code are assigned to the second domain identifier, identifying a value credential associated with the value token, adding the value credential to the second authorization request message, sending the second authorization request message to the authorizing entity computer, receiving a second authorization response message including the value credential from the authorizing entity computer, replacing the value credential with the value token and the second token code in the authorization response message, and forwarding the authorization response message.

Another embodiment of the invention is directed to a token service system configured to perform the above-described method.

Further details regarding embodiments of the invention can be found in the Detailed Description and the Figures.

DETAILED DESCRIPTION

Figure 1:
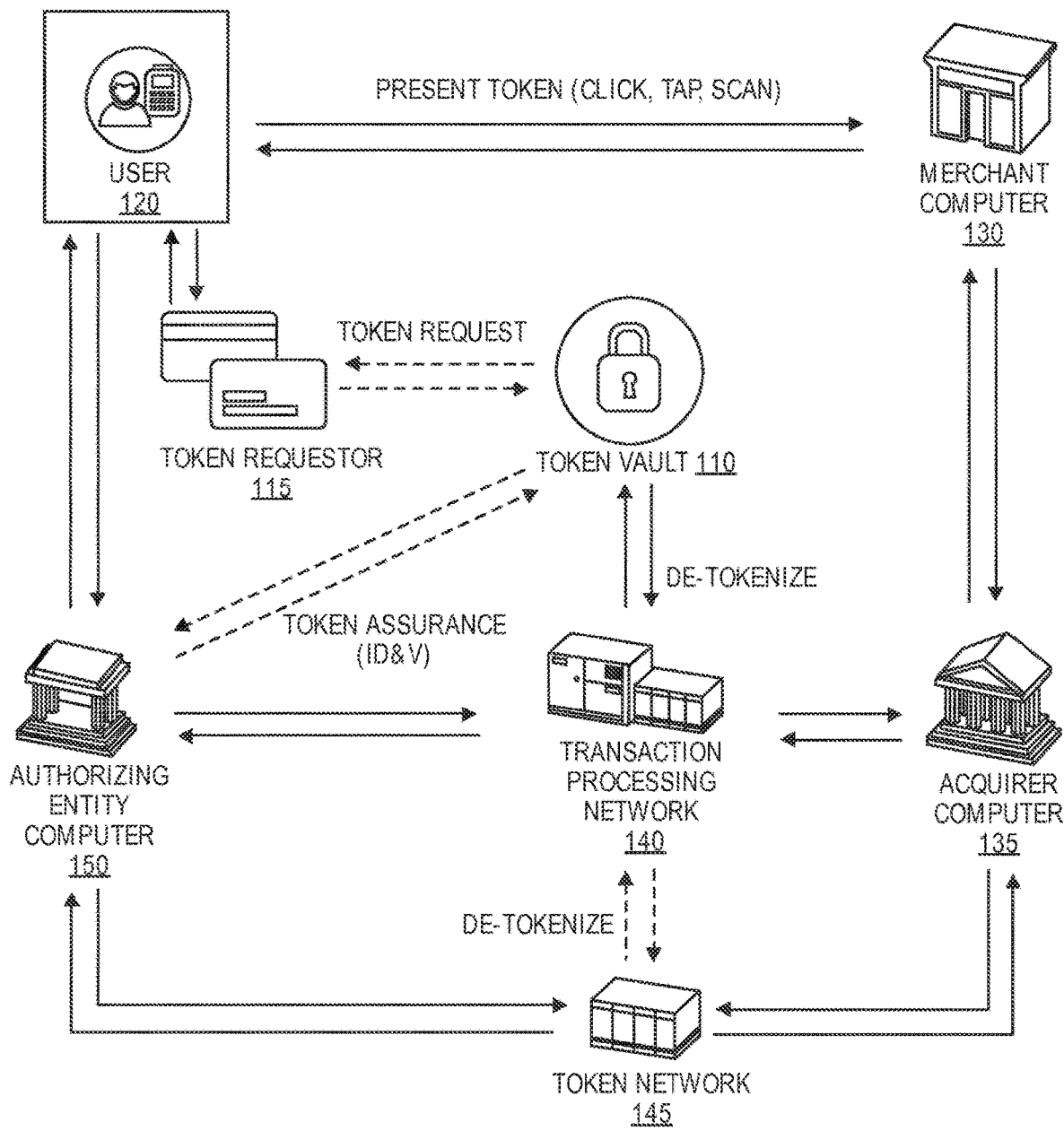
FIG. 1 shows a block diagram of a system according to an embodiment of the invention.

Embodiments of the present invention are directed to providing, in addition to a value token, a token code to a token requestor. The token code can serve as a shared secret between a token holder and a token vault. Both the value token and the token code can be provided together during a transaction, and the token code can be used to authenticate that the token holder is authorized to use the value token.

In some embodiments, one value token can be provided for use in multiple domains. Each domain may receive a different token code along with the value token. If the value token is received for a transaction through a certain domain, it may only be considered valid if accompanied by the appropriate token code for that domain.

As discussed above, using value tokens can lead to a token numeric issue. For example, a typical PAN (payment account number) is composed of 16 digits. If each digit can range from 0-9, than there are $10^{16}$ possible unique PANs. However, certain digits within a PAN are sometimes occupied by various types of identification information. For example, the first six digits may be used to indicate a BIN (bank identification number). Other digits may be used for other purposes, such as the final digit being used as a checksum. In some embodiments, the number of digits used to actually identify a specific account may be as low as (or lower than) 9 digits. In the example of 9 digits, there are now only $10^9$, or one billion, possible unique values. Considering that there may be many millions of account holders, that there may be multiple tokens associated with each account at any given time, and that each token might be refreshed regularly (e.g., once a week, after each transaction, etc.), it can be seen that one billion unique values may not be enough to accommodate tokenization applications.

Embodiments of the invention solve this issue by providing one value token for use in multiple token domains, along with a different token code for each domain. Instead of increasing token proliferation (e.g., by issuing a different value token to every domain, by constantly refreshing value tokens, etc.), a single value token can be issued to each domain for a certain payment account. Current token formats may provide enough possible token values to accommodate a single unique value token per payment account. For example, one billion values may be sufficient for each account holder to have a unique token value. The token code allows the single value token to be widely distributed without sacrificing security, as a token code may be required when using the value token, and token codes may only be provided to (and valid for) domains that are authorized to use the value token.

This can also solve the issue of tracking users. As described above, incorporating token codes allows a payment account to be uniquely represented by a single value token across all domains. Accordingly, entities (e.g., acquirers and merchants) that previously used a PAN to track user activity can now simply use the value token instead (as it may be provided during transactions instead of the PAN). Thus, entities can essentially continue tracking user activity as usual. In some cases, the value token may be formatted similarly to a PAN, so entities may not be able to distinguish between a value token and a PAN, and they may not even notice that anything changed. For example, a value token be a 16 digit number, such as "4146 7238 9345 7895". Acquirers and merchants may use the entire number, or a portion of the number (such as field 2, the last four digits "7895", etc.) to identify an account and/or user. When communicating about the user, entities may refer to the user by the value token "4146 7238 9345 7895". Also, when identifying which user is participating in a transaction, acquirers and merchants identify a user record based on the value token "4146 7238 9345 7895".

This token code system may be easily adopted by merchants, acquirers, and other relevant entities. Minimal changes are needed for existing systems (e.g., user activity tracking remains the same, as described above). Token holders may simply store an extra value (the token code), and other entities may simply pass the token code along in authorization request and response messages. In some embodiments, the token code may be able to fit within existing authorization message formats without requiring any changes. Thus, a token system that increases payment security can be introduced with minimal interruptions.

Prior to discussing specific embodiments of the invention, some terms may be described in detail.

An "interaction" may include a communication, contact, or exchange between parties, devices, and/or entities. In some embodiments, data can be exchanged in an interaction between two devices (e.g., an interaction between a mobile device and an access device).

A "value credential" may be information associated with worth. Examples of a value credential include payment credentials, information needed to obtain a promotional offer, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a user name, an expiration date, a gift card number or code, and any other suitable information.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other-information which may be replaced with a substitute value (i.e., token). Tokenization may be used to enhance transaction efficiency, improve transaction security, increase service transparency, or to provide a method for third-party enablement.

A "value token" may be an identifier for worth. Examples of a value token include payment tokens, a coupon identifier, etc.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "token code" may be any string of characters that serve as evidence of permission for using a value token (e.g., a payment token). In some embodiments, a token code may be a hexadecimal value. In other embodiments, a token code could be any other alphabetical, numeric, or alphanumeric value. For example, in some embodiments, a token code may be composed of five characters, or any other suitable number of characters. A token code may also be a random or otherwise un-guessable value. A token code may be issued to a holder of a value token, and the token code may be able to validate the value token. The combination of the token code and a value token may constitute a unique combination. A token code may also be associated with a domain ID (e.g., that indicates a token domain), such that a value token is validated by a token code and an associated domain ID. In some embodiments, a token code may be unique for a value token to which it is assigned. However, the token code may not necessarily be globally unique. For example, the same token code could possibly be randomly generated and assigned for a different value token. Thus, running out of unique token codes may not be a concern.

A "token service system" or "token service computer" can include a system that that services payment tokens. In some embodiments, a token service system can facilitate requesting, determining (e.g., generating) and/or issuing tokens, as well as maintaining an established mapping of tokens to primary account numbers (PANs) in a repository (e.g. token vault). In some embodiments, the token service system may establish a token assurance level for a given token to indicate the confidence level of the token to PAN binding. The token service system may include or be in communication with a token vault where the generated tokens are stored. The token service system may support token processing of payment transactions submitted using tokens by de-tokenizing the token to obtain the actual PAN. In some embodiments, a token service system may include a token service computer alone, or in combination with other computers such as a transaction processing network computer. Various entities of a tokenization ecosystem may assume the roles of the token service provider. For example, payment networks and issuers or their agents may become the token service provider by implementing the token services according to embodiments of the present invention.

In addition to generating and processing payment tokens, a token service computer can generate, issue, and process token codes. For example, a token service computer can generate and provide a token code for each distributed payment token. In some embodiments, a single payment token can be distributed to multiple token requestors, but a different token code may be provided to each token requestor for the single payment token. Similarly, when de-tokenizing a payment token, the token service computer can verify that a payment token is accompanied by an appropriate token code and/or domain ID.

A "token vault" may be an example of a token service computer and can include a repository that maintains established token-to-PAN mappings. According to various embodiments, the token vault may also maintain other attributes of the token requestor that may be determined at the time of registration. The attributes may be used by the token service provider to apply domain restrictions or other controls during transaction processing. In some embodiments, the token vault may be a part of the token service system or the token service provider. Alternatively, the token vault may be a remote repository accessible to the token service provider. Token vaults, due to the sensitive nature of the data mappings that are stored and managed in them, may be protected by strong underlying physical and logical security.

"Token exchange" or "de-tokenization" can include a process of restoring the data that was substituted during tokenization. For example, a token exchange may include replacing a payment token with a corresponding primary account number (PAN) that was associated with the payment token during tokenization of the PAN. Thus, the de-tokenization may refer to the process of redeeming a token for the associated PAN value based on a token-to-PAN mapping stored, for example, in a token vault. The ability to retrieve a PAN in exchange for the associated token may be restricted to specifically authorized entities, individuals, applications, or systems. Further, de-tokenization or token exchange may be applied to any other information. In some embodiments, token exchange may be achieved via a transactional message, such as an ISO message, an application programming interface (API), or another type of web interface (e.g., web request).

A "token requestor" include an entity that requests a token. The token requestor may initiate a request that a primary account number (PAN) be tokenized by submitting a token request message to the token service provider. According to various embodiments, a token requestor may no longer need to store a PAN associated with a token once the requestor has received a requested token. The requestor may be an application, a device, a process, or a system that is configured to perform actions associated with tokens. A token requestor can request registration with a network token system, request token generation, token activation, token de-activation, token exchange, token lifecycle management related processes, and/or any other token related processes. A requestor may interface with a network token system through any suitable communication networks and/or protocols (e.g., using HTTPS, SOAP and/or an XML interface among others). Some non-limiting examples of token requestors may include, for example, communication devices (e.g., mobile phones and computers) operated by users, card-on-file merchants, acquirers, acquirer processors, and payment gateways acting on behalf of merchants, payment enablers (e.g., original equipment manufacturers, mobile network operators, etc.), digital wallet providers, issuers, third party wallet providers, and/or transaction processing networks. In some embodiments, a token requestor can request tokens for multiple domains and/or channels. A token requestor may be registered and identified uniquely by the token service provider within the tokenization ecosystem. During token requestor registration, the token service provider may formally process the token requestor's application to participate in the token service system. The token service provider may collect information pertaining to the nature of the requestor and the relevant use of tokens to validate and formally approve the token requestor and establish appropriate domain restriction controls. Successfully registered token requestors may be assigned a domain ID that may also be entered and maintained within the token vault. Token requestors may be revoked or assigned new domain ID. This information may be subject to reporting and audit by the token service provider.

A "token domain" may indicate an area and/or circumstance in which a token can be used. Examples of the token domain may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e. token domain restriction controls) may be established as part of token issuance by the token service provider that may allow for enforcing appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor. For example, a token requestor may request tokens for a certain domain, and both the token requestor and domain may be identified by a certain domain ID.

A "domain identifier (ID)" may include an identifier for a token domain and/or a token requestor. It may include any characters, numerals, or other identifiers associated with an entity associated with a network token system. In some embodiments, a unique domain ID may be assigned for each domain associated with the same token requestor. For example, a domain ID can identify a pairing of a token requestor (e.g., a mobile device, a merchant, a mobile wallet provider, etc.) with a token domain (e.g., e-commerce, contactless, etc.). A domain ID may include any format or type of information. For example, in one embodiment, the domain ID may include an alphanumerical value such as a ten digit or an eleven digit letter and/or number (e.g., 4678012345). In some embodiments, a domain ID may include a code for a token service provider (e.g., first 3 digits) such as the network token system and the remaining digits may be assigned by the token service provider for each requesting entity (e.g., mobile wallet provider) and the token domain (e.g., contactless, e-commerce, etc.).

"Token expiry date" may refer to the expiration date/time of the token. The token expiry date may be passed among the entities of the tokenization ecosystem during transaction processing to ensure interoperability. The token expiration date may be a numeric value (e.g. a 4-digit numeric value).

A "mobile device" may comprise any suitable electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile devices include mobile phones (e.g. cellular phones), PDAs, tablet computers, net books, laptop computers, personal music players, hand-held specialized readers, etc. Further examples of mobile devices include wearable devices, such as smart watches, fitness bands, ankle bracelets, rings, earrings, etc., as well as automobiles with remote communication capabilities. A mobile device may comprise any suitable hardware and software for performing such functions, and may also include multiple devices or components (e.g. when a device has remote access to a network by tethering to another device—i.e. using the other device as a modem—both devices taken together may be considered a single mobile device).

A mobile device may also include any suitable device that may be used to conduct a financial transaction, such as to provide payment credentials to a merchant. Such a mobile device may be in any suitable form. For example, suitable mobile devices can be hand-held and compact so that they can fit into a user's wallet and/or pocket (e.g., pocket-sized). They may include smart cards, magnetic stripe cards, keychain devices (such as the Speedpass™ commercially available from Exxon-Mobil Corp.), etc. Other examples of mobile devices include pagers, payment cards, security cards, access cards, smart media, transponders, and the like. If the mobile device is in the form of a debit, credit, or smartcard, the mobile device may also optionally have features such as magnetic stripes. Such devices can operate in either a contact or contactless mode.

"Short range communication" or "short range wireless communication" may comprise any method of providing short-range contact or contactless communications capability, such as RFID, Bluetooth™, infra-red, or other data transfer capability that can be used to exchange data between a mobile device and an access device. In some embodiments, short range communications may be in conformance with a standardized protocol or data transfer mechanism (e.g., ISO 14443/NFC). Short range communication typically comprises communications at a range of less than 2 meters. In some embodiments, it may be preferable to limit the range of short range communications (e.g., to a range of less than 1 meter, less than 10 centimeters, or less than 2.54 centimeters) for security, technical, and/or practical considerations.

An "application" may be computer code or other data stored on a computer readable medium (e.g. memory element or secure element) that may be executable by a processor to complete a task.

A "digital wallet" can include an electronic device that allows an individual to conduct electronic commerce transactions. A digital wallet may store user profile information, payment credentials, bank account information, one or more digital wallet identifiers and/or the like and can be used in a variety of transactions, such as but not limited to eCommerce, social networks, money transfer/ personal payments, mobile commerce, proximity payments, gaming, and/or the like for retail purchases, digital goods purchases, utility payments, purchasing games or gaming credits from gaming websites, transferring funds between users, and/or the like. A digital wallet may be designed to streamline the purchase and payment process. A digital wallet may allow the user to load one or more payment cards onto the digital wallet so as to make a payment without having to enter an account number or present a physical card.

A "digital wallet provider" may include an entity, such as an issuing bank or third party service provider, that issues a digital wallet to a user that enables the user to conduct financial transactions. A digital wallet provider may provide standalone user-facing software applications that store account numbers, or representations of the account numbers (e.g., payment tokens), on behalf of a cardholder (or other user) to facilitate payments at more than one unrelated merchant, perform person-to-person payments, or load financial value into the digital wallet. A digital wallet provider may enable a user to access its account via a personal computer, mobile device or access device. Additionally, a digital wallet provider may also provide one or more of the following functions: storing multiple payment cards and other payment products on behalf of a user, storing other information including billing address, shipping addresses, and transaction history, initiating a transaction by one or more methods, such as providing a user name and password, NFC or a physical token, and may facilitate pass-through or two-step transactions.

A "user" may include an individual that may be associated with one or more personal accounts and/or mobile devices. The user may also be referred to as a cardholder, account holder, or consumer.

An "issuer" or "authorizing entity" may typically refer to a business entity (e.g., a bank) that maintains an account for a user.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers.

An "access device" may be any suitable device that provides access to a remote system. An access device may also be used for communicating with a merchant computer, a transaction processing network, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In the examples provided herein, an access device and merchant computer may be referred to as separate system components. It should be appreciated, however, that the access device and merchant computer may be a single component, for example, one merchant mobile device or POS device.

An "authorization request message" may be an electronic message that is sent to a transaction processing network and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, etc., as well as any other information that may be utilized in determining whether to identify and/or authorize a transaction.

An "authorization response message" may be an electronic message reply to an authorization request message generated by an issuing financial institution or a transaction processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing network) to the merchant's access device (e.g. POS equipment) that indicates approval of the transaction. The code may serve as proof of authorization. As noted above, in some embodiments, a transaction processing network may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

FIG. 1 shows a system 100 comprising a number of components. The system 100 comprises a token vault 110, which may be an example of at least part of a token service provider computer. The token vault 110 may be in communication with one or more of a token requestor 115, a merchant computer 130, an acquirer computer 135, a transaction processing network 140, and an authorizing entity computer 150. Each of the token requestor 115, the merchant computer 130, the acquirer computer 135, the transaction processing network 140, and the authorizing entity computer 150 may be embodied by one or more computers.

The user 120 (i.e., a device operated by the user 120) may be in communication with the token requestor 115, the authorizing entity computer 150, and the merchant computer 130. Furthermore, the merchant computer 130, the acquirer computer 135, the transaction processing network 140, the authorizing entity computer 150, and a token network 145 may all be in operative communication with each other through any suitable communication channel or communications network. A suitable communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

The token vault 110 may be associated with the transaction processing network 140, the authorizing entity computer 150, the acquirer computer 135, or the merchant computer 130. For example, in some embodiments, a token service provider may comprise an associated token vault 110 and transaction processing network 140. The token vault 110 may be able to issue payment tokens, token codes, and domain IDs. The token vault 110 may also be able to authenticate and de-tokenize payment tokens, token codes, and domain IDs.

Figure 2:
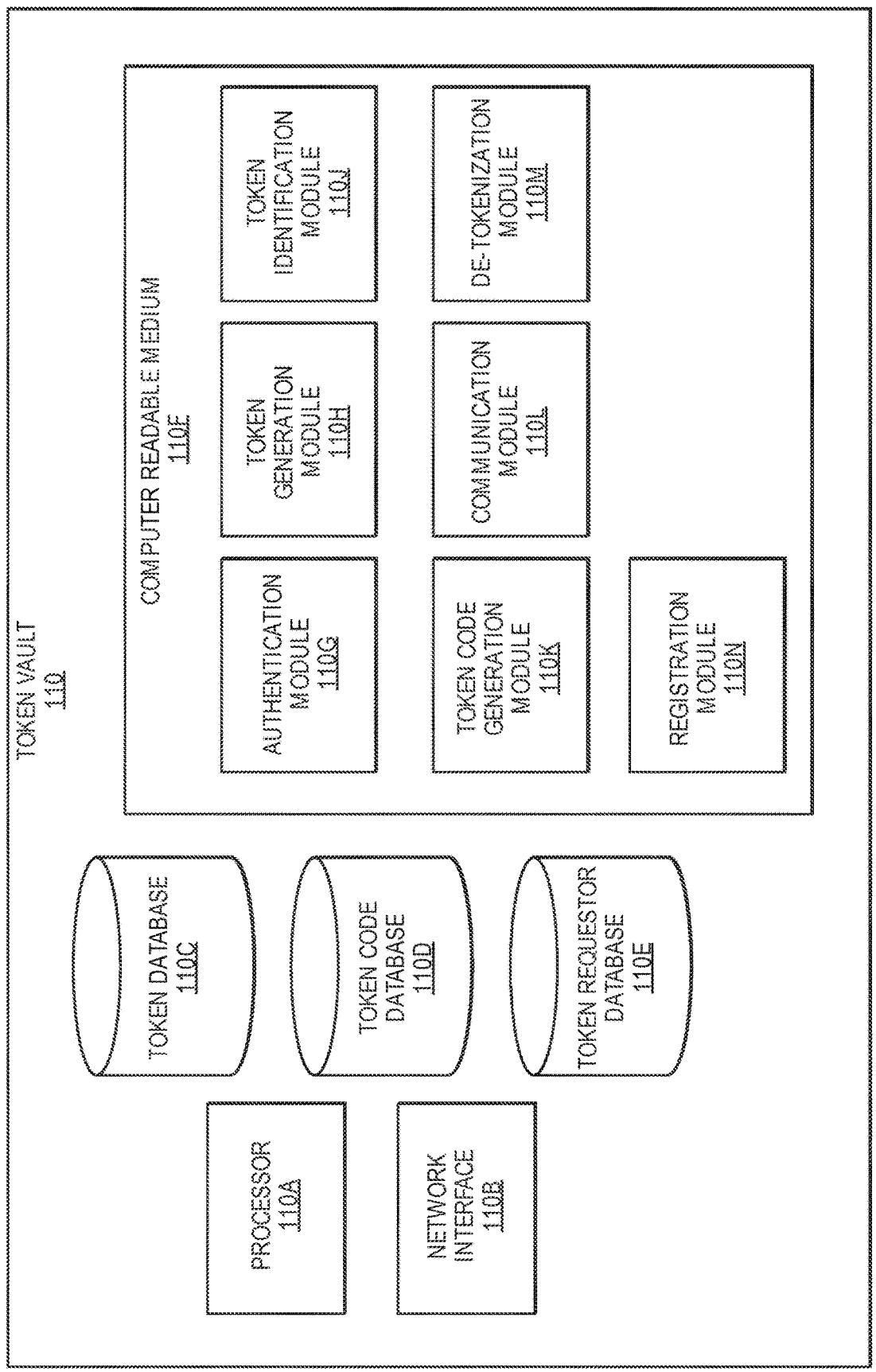
FIG. 2 shows a block diagram of a token vault computer according to an embodiment of the invention.

An example of the token vault 110, according to some embodiments of the invention, is shown in FIG. 2. The token vault 110 comprises a processor 110A, a network interface 1108, a token database 110C, a token code database 110D, a token requestor database 110E, and a computer readable medium 110F.

The computer readable medium 110F may comprise an authentication module 110G, a token generation module 110H, a token identification module 110J, a token code generation module 110K, a communication module 110L, a de-tokenization module 110M, a registration module 110N, and any other suitable module. It may also comprise code, executable by the processor 110A for implementing a method comprising receiving a first token request from a first token requestor computer, wherein the first token request includes a value credential and a first domain identifier; identifying a value token associated with the value credential; generating a first token code associated with the value token; assigning the value token and the first token code to the first domain identifier; transmitting the value token and the first token code to the first token requestor computer, wherein the first token requestor subsequently uses the value token for an interaction, and wherein the first token requestor's subsequent use of the value token is valid if the value token is accompanied by the first token code; receiving a second token request from a second token requestor computer, wherein the second token request includes the value credential and a second domain identifier; identifying the value token associated with the value credential; generating a second token code associated with the value token; assigning the value token and the second token code to the second domain identifier; and transmitting the value token and the second token code to the second token requestor computer, wherein the second token requestor subsequently uses the value token for an interaction, and wherein the second token requestor's subsequent use of the value token is valid if the value token is accompanied by the second token code.

The authentication module 110G may comprise code that causes the processor 110A to authenticate a token requestor 115. For example, the token vault 110 can receive a token request from the token requestor 115, the request including a domain ID that identifies the token requestor 115, as well as a set of payment credentials that identify a payment account. The authentication module 110G may contain logic that causes the processor 110A to authenticate the domain ID or otherwise authenticate the token requestor. The authentication module 110G may utilize information, such as stored domain IDs, from the token requestor database 110E.

The token generation module 110H may comprise code that causes the processor 110A to generate payment tokens. For example, the token generation module 110H may contain logic that causes the processor 110A to issue a payment token that can be used as surrogate payment account information for a set of payment credentials included in a token request. Any suitable token generation process can be used. Such processes can utilize hashing, encryption, or random token generation processes. A record of the token may be stored at the token database 110C, and the record may include the token, token expiration date, associated payment account information, token assurance information, token requestor information (e.g. a domain ID), and/or any other suitable information.

The token generation module 110H may be able to periodically update payment tokens. For example, new payment tokens can be generated and sent to replace old payment tokens, and the payment tokens can be stored in token database 110C.

The token identification module 110J may comprise code that causes the processor 110A to identify a payment token. For example, the token identification module 110J may contain logic that causes the processor 110A to identify a payment token that is associated with a set of payment credentials received in a token request. In some embodiments, a payment token may be assigned to more than one token requestor 115. The payment token may be generated when a first token requestor 115 initially requests a token for the payment credentials. When a second token requestor 115 requests a token for the same payment credentials, the token identification module 110J may be used to identify the existing payment token, instead of generating another payment token. The token identification module 110J also may update the record of the payment token at the token database 110C to indicate that the second token requestor 115 (e.g. the second domain ID) is also associated with the payment token.

The token code generation module 110K may comprise code that causes the processor 110A to generate token codes. For example, the token code generation module 110K may contain logic that causes the processor 110A to generate a token code associated with a payment token for a certain token requestor 115. Any suitable token code generation process can be used. Such processes can utilize hashing, encryption, or random token generation processes. In some embodiments, when a payment token is provided to a token requestor 115, a token code is also provided. The token code may serve as a passcode for utilizing the payment token. The token vault 110 may provide a different token code to each token requestor that requests the same payment token. Thus, multiple token requestors 115 may possess the same payment token, but they each may have a different token code for that payment token. In order to use the payment token, a token requestor 115 may also need to provide their token code.

The token code generation module 110K may also store a record of the token code at the token code database 110D. The record may indicate a domain ID and/or a payment token associated with the token code. In addition or alternatively, the token code generation module 110K may cause the record of the payment token at the token database 110C to indicate one or more token codes and/or domain IDs associated with the payment token.

The token code generation module 110K may be able to periodically update token codes. For example, new token codes can be generated and sent to replace old token codes, and the new token codes can be stored in the token code database 110D.

The communication module 110L may comprise code that causes the processor 110A to communicate with one or more entities. For example, the communication module 110L may contain logic that causes the processor 110A to receive token requests and send payment tokens to token requestors 115. The communication module 110L may also be able to receive de-tokenization requests and send payment credentials to the transaction processing network 140 and any other suitable entity.

The de-tokenization module 110M may comprise code that causes the processor 110A to de-tokenize a payment token. For example, the de-tokenization module 110M may contain logic that causes the processor 110A to identify a set of payment credentials associated with a payment token (e.g., as indicated in the token database 110C). The de-tokenization module 110M may also be able to authenticate a payment token by validating that a received token code and/or domain ID are associated with the payment token (e.g., as indicated in the token code database 110D). For example, the token vault 110 may receive requests for payment account information from the transaction processing network 140, authorizing entity computer 150, and any other suitable entities. The token vault 110 may receive such a de-tokenization request including a payment token, token code, and/or domain ID, the token vault 110 may authenticate the information and identify the associated payment credentials, and then the token vault 110 may provide the payment account information to the de-tokenization requestor.

The token vault 110 may also allow the token requestor 115 to register at the token vault 110. The registration module 110N may comprise code that causes the processor 110A to register a token requestor 115. For example, the registration module 110N may contain logic that causes the processor 110A to receive a request to register from the token requestor 115, the request including information about the token requestor 115, information about how tokens will be used (e.g. token domain information), a desired token assurance level, or any other suitable information. The token vault 110 may authenticate the identity of the token requestor 115, and the token vault 110 may approve or reject the registration request. If approved, the token vault 110 may generate and issue a domain ID for the token requestor 115. The domain ID may serve to identify the token requestor 115 as well as a token domain for which issued payment tokens will be used.

The registration module 110N may be able to periodically update domain IDs. For example, new domain IDs can be generated and sent to replace old domain IDs, and the new domain IDs can be stored in the token requestor database 110E.

Referring back to FIG. 1, a number of different entities can act as the token requestor 115, according to embodiments of the invention. For example, in some embodiments, the token requestor 115 can be a mobile device associated with the user 120. A user 120 may activate a mobile payment functionality on the mobile device and request that a certain set of payment credentials are usable for mobile payments. In this case, the mobile device may request a payment token associated with the payment credentials. Then, the user 120 can use the mobile device to provide a payment to the merchant computer 130.

Figure 3:
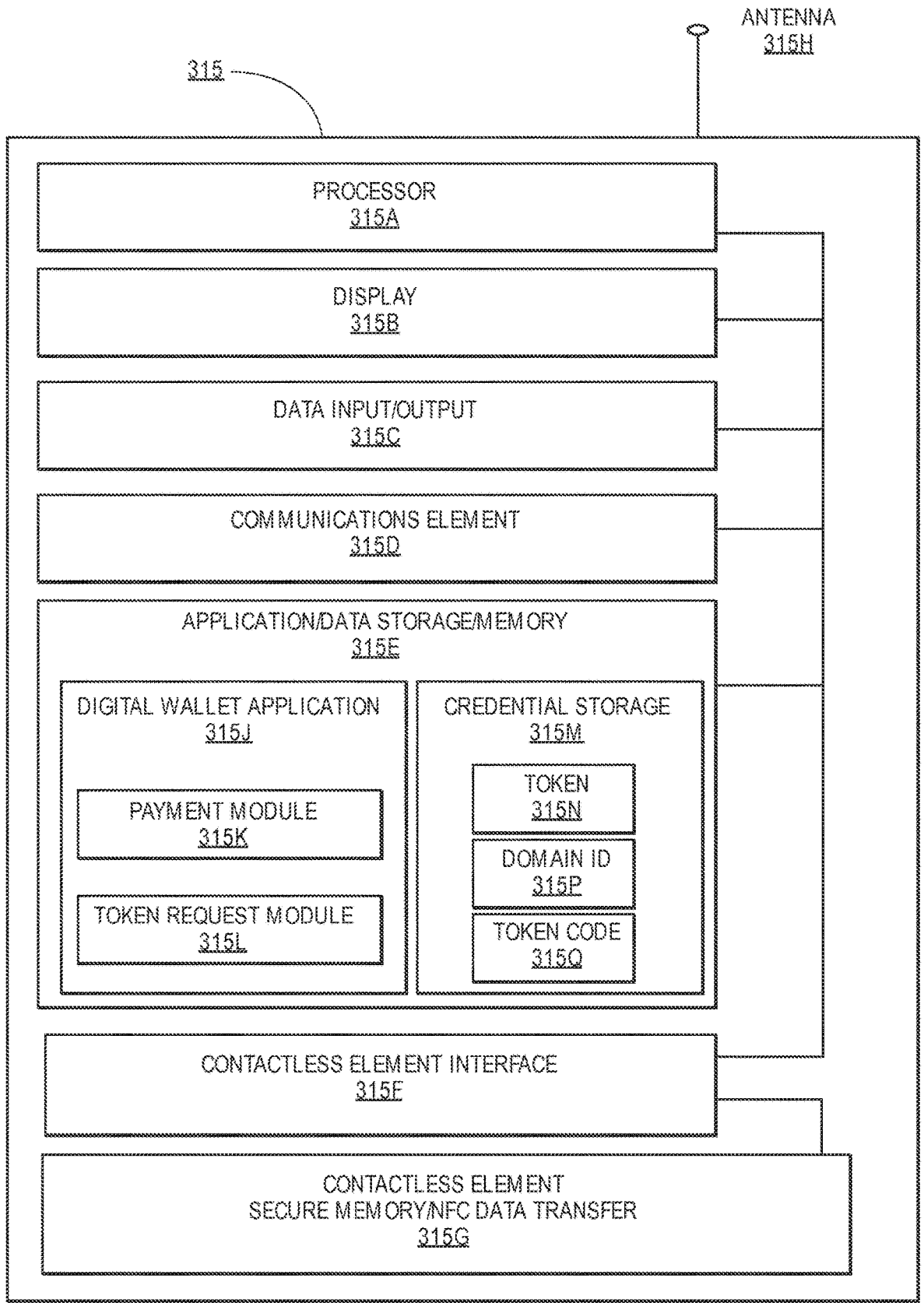
FIG. 3 shows a block diagram of an exemplary mobile device according to an embodiment of the invention.

FIG. 3 shows an example of such a mobile device 315 that can act as a token requestor 115 and/or be used for mobile payments, according to some embodiments of the invention. Mobile device 315 may include circuitry that is used to enable certain device functions, such as telephony. The functional elements responsible for enabling those functions may include a processor 315A that can execute instructions that implement the functions and operations of the device. Processor 315A may access memory 315E (or another suitable data storage region or element) to retrieve instructions or data used in executing the instructions, such as provisioning scripts and mobile applications. Data input/output elements 315C, such as a keyboard or touchscreen, may be used to enable a user to operate the mobile device 315 and input data (e.g., user authentication data). Data input/output elements may also be configured to output data (via a speaker, for example). Display 315B may also be used to output data to a user. Communications element 315D may be used to enable data transfer between mobile device 315 and a wired or wireless network (via antenna 315H, for example) to assist in connectivity to the Internet or other network, and enabling data transfer functions. Mobile device 315 may also include contactless element interface 315F to enable data transfer between contactless element 315G and other elements of the device, where contactless element 315G may include a secure memory and a near field communications data transfer element (or another form of short range communications technology). As noted, a cellular phone or similar device is an example of a mobile device 315 that may be used in accordance with embodiments of the present invention. However, other forms or types of devices may be used without departing from the underlying concepts of the invention. For example, the mobile device 315 may alternatively be in the form of a payment card, a key fob, a tablet computer, a wearable device, etc.

The memory 315E may comprise a digital wallet application 315J, a payment module 315K, a token request module 315L, a credential storage 315M, a payment token 315N, a domain ID 315P, a token code 315Q, and any other suitable module or data. The mobile device 315 may have any number of mobile applications installed or stored on the memory 315E and is not limited to that shown in FIG. 3.

The digital wallet application 315J may comprise code that causes the processor 315A to provide digital wallet services. For example, the digital wallet application 315J may contain logic that causes the processor 315A to provide a user interface for the user to provide input and initiate, facilitate, and manage transactions using the mobile device 315. The digital wallet application 315F may be able to access payment credentials, such as the token 315N, the token code 315Q, and the domain ID 315P stored in the credential storage 315M. Further, the digital wallet application 315F may be able to obtain payment tokens from the token vault 110 (e.g., via the token request module 315L). For example, the token request module 315L may send a token request including a set of payment credentials (which may have been provided by the user 120) as well as a domain ID 315P associated with the mobile device 315.

The digital wallet application 315F may also be able to provide the payment credentials for a transaction (e.g., via the payment module 315L). In some embodiments, the digital wallet application 315F may be able to provide payment credentials for online payments and/or in-person transactions (e.g., via short-range communication). In one example, the digital wallet application 315F may generate single data element such as an NFC transmission packet or a QR code including the token 315N, the token code 315Q, and the domain ID 315P, and any other suitable information.

The credential storage 315M may be able to store one or more tokens 315N, token codes 315Q, and domain IDs 315P. For example, the credential storage 315M may store credentials for one or more payment accounts, and there may be a different token 315N and token code 315Q for each payment account. The mobile device 315 may also be able to request payment tokens for more than one token domain, and the mobile device 315 may use a different domain ID 315P for each different token domain. If one token 315N is used for multiple domains (e.g., in-person contactless payments and online payments), the mobile device 315 may possess a different token code 315Q for each domain (and domain ID 315P).

Referring back to the token requestor 115 in FIG. 1, in some embodiments, the merchant computer 130 can act as the token requester 115. For example, the merchant computer 130 can have a card-on-file for the user 120. Instead of storing the user's sensitive payment credentials, the merchant computer 130 may be able to request and store an associated payment token. In this case, when the user 120 makes a purchase at the merchant computer 130, the merchant computer 130 can submit the stored payment token for the transaction. In other embodiments, the merchant computer 130 may not be a token holder, and may instead receive a payment token from the mobile device 315 during a transaction.

Figure 4:
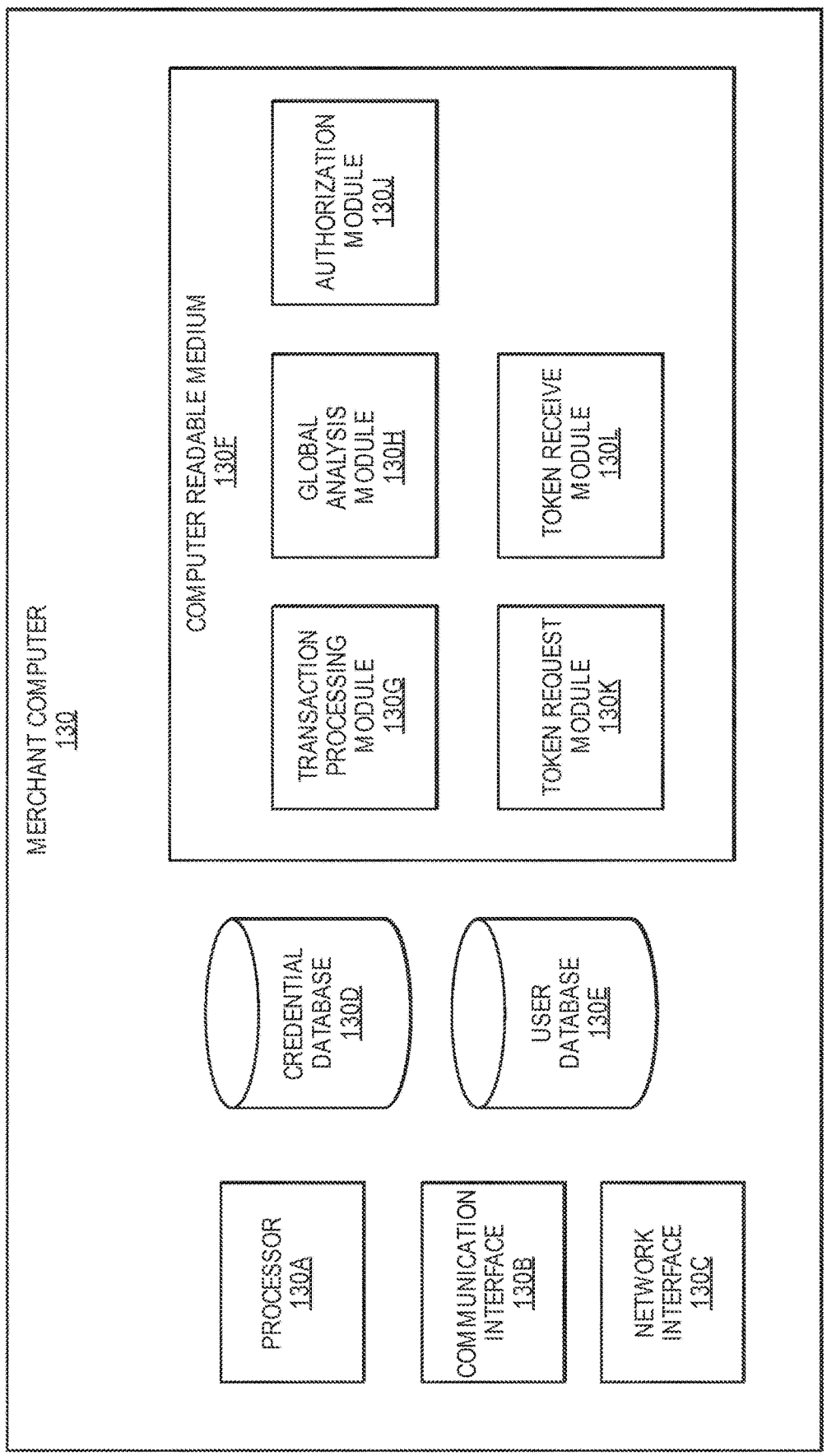
FIG. 4 shows a block diagram of a merchant computer according to an embodiment of the invention.

An example of the merchant computer 130 (e.g., a server computer operated by the merchant), according to some embodiments of the invention, is shown in FIG. 4. The merchant computer 130 comprises a processor 130A, a communication interface 130B, a network interface 130C, a credential database 130D, a user database 130E, and a computer readable medium 130F.

The computer readable medium 130F may comprise a transaction processing module 130G, a global analysis module 130H, an authorization module 130J, a token request module 130K, a token receive module 130L, and any other suitable module.

The transaction processing module 130G may comprise code that causes the processor 130A to process transactions. For example, the transaction processing module 130G may contain logic that causes the processor 130A to receive payment credentials (e.g., a payment token) from the user 120 for a transaction. In some embodiments, the merchant computer 130 may store a payment token associated with the user 120 (e.g., at the credential database 130D), and the transaction processing module 130G identify the payment token when the user 120 initiates a purchase. The transaction processing module 130G may be able to initiate transaction authorization (using either received payment credentials or an identified payment token), and may also be able to finalize a transaction so that goods and/or services can be released.

The global analysis module 130H may comprise code that causes the processor 130A to analyze payment credentials. For example, the global analysis module 130H may contain logic that causes the processor 130A to use a payment token to track user 120 spending habits.

In some embodiments, the global analysis module 130H may use a payment token as a user 120 identifier instead of a PAN. The global analysis module 130H may keep a record (e.g., at the user database 130E) of user 120 trends by recording transactions that involve the payment token. As explained above, in some embodiments, the same payment token that represents a certain payment account can be provided to multiple token requestors 115. As a result, the payment token may be static, so that the same payment token is provided each time a user 120 uses a certain payment account at a merchant computer 130, even if the token code, domain ID, and/or token domain can vary. For example, in some embodiments, one payment account may be associated with several digital wallets, and each digital wallet may have the same payment token associated with the same payment account. The merchant computer 130 may receive the same payment token whenever any of these different digital wallets are used. Thus, the global analysis module 130H may be able to recognize a payment account by a received payment token.

In some embodiments, the payment token may comprise 16, 18, or 19 digits and can be formatted as a PAN so that merchants 130 can easily integrate a payment token into an existing user-tracking system that typically uses a PAN for user tracking. For example, users are sometimes identified by a portion of the PAN known as "field 2". Payment tokens may also include a "field 2" that can similarly identify a payment account or user. The payment token may replace a PAN for any suitable identification purpose. A payment token may also be formatted to indicate an authentication entity 150 and/or a token vault 110.

In some embodiments, the merchant computer 130 (e.g., via the global analysis module 130H) may use the payment token and associated user purchase record for other applications including value added services such as loyalty programs, backend applications, and reporting. For example, the payment token may function as a user 120 loyalty identifier for tracking loyalty points (e.g., at the user database 130E) and providing rewards or special offers.

The merchant computer 130 (or other entity) may also use the payment token for fraud/risk checks during authorization. For example, the merchant computer 130 (e.g., via the global analysis module 130H) may be able to detect high-velocity transactions. If too many transactions associated with the payment token occur within a certain amount of time, the merchant computer 130 may suspect fraudulent activity. The merchant computer 130 may then reject further transactions involving the payment token. Alternatively, the merchant computer 130 may mark the payment token as high-risk or put the payment token on a "blacklist." The merchant computer 130 may also use the payment token to review fraud/risk levels after a transaction is authorized.

The merchant computer 130 may use the payment token to access past transactions. For example, the merchant computer 130 may use the payment token to identify a past transaction (e.g., stored in the user database 130E) for a refund or an inquiry.

The payment token may also be used for providing a transaction feed to third party value added applications. For example, the merchant computer 130 may inform third party applications about user 120 purchases and trends that are tracked via the payment token. A third-party may use a transaction feed for providing rewards or offers to the user 120 in real time or offline (e.g., in a statement of credit).

The authorization module 130J may comprise code that causes the processor 130A to send and receive authorization messages. For example, the authorization module 130J may contain logic that causes the processor 130A to generate an authorization request message including payment credentials (e.g., a payment token, token code, domain ID, name, etc.), transaction data, and any other relevant information, and then send the authorization request message to the acquirer computer 135. An authorization response message from the acquirer computer 135 can also be received and processed.

The token request module 130K may comprise code that causes the processor 130A to request payment tokens. For example, the token request module 130K may contain logic that causes the processor 130A to send a token request to the token vault 110, the token request including a set of payment credentials (which may have been provided by the user 120) as well as a domain ID 315P associated with the merchant computer 130.

The token receive module 130L may comprise code that causes the processor 130A to receive and store payment tokens and other associated credentials. For example, the token receive module 130L may contain logic that causes the processor 130A to receive a requested payment token along with an associated token code, domain ID, and/or any other suitable information. The token receive module 130L may be able to store any received payment tokens and associated information in the credential database 130D. The merchant computer 130 may store payment tokens for users 120 that wish to store payment account information at the merchant computer 130 (e.g., for convenience). The merchant computer 130 may be able to submit a stored payment token for one or more purchases initiated by the user 120.

The credential database 130D may be able to store one or more payment tokens, token codes, and/or domain IDs. For example, the credential storage 130D may store credentials for one or more payment accounts, and there may be a different payment token and token code for each payment account. The merchant computer 130 may also be able to request payment tokens for more than one token domain, and the merchant computer 130 may use a different domain ID for each different token domain.

Referring back to the token requestor 115 in FIG. 1, in some embodiments, the token requestor 115 may be a token aggregator. For example, a token aggregator may request tokens on behalf of one or more digital wallet providers. A digital wallet provider may prefer not to register with a token vault 110 and instead receive tokens from the token aggregator. Digital wallet providers may receive tokens from a token aggregator and then provide the tokens to users and mobile devices that use a digital wallet. In some embodiments, a token requestor 115 may be able to request and collect tokens from multiple token vaults 110 or token service providers, and may request tokens that are valid for multiple transaction processing networks 140. The token requestor 115 may register with each token vault 110 separately.

Referring back to FIG. 1, the acquirer computer 135 may be associated with the merchant computer 130, and may manage authorization requests on behalf of the merchant computer 130. The acquirer computer 135 may receive an authorization request message including payment information from the merchant computer 130 and send the authorization request message to the transaction processing network 140.

As explained above, in some embodiments, the same payment token that represents a certain payment account can be held and used by different token requestors 115 (e.g., mobile devices 315, merchants 130, third-party token providers, etc.). As a result, each time the payment account is used for a transaction, the acquirer computer 135 may receive the same payment token in an authorization request message, regardless of the payment domain. As a result, the acquirer computer 135 may also be able use the payment token to track user 120 activity, as already described for the merchant computer 130 above.

For example, the acquirer computer 135 may use the payment token for online fraud analysis, offline fraud analysis, loyalty services, third party loyalty programs, reporting to merchants, or any other suitable purpose. For example, in some embodiments, the acquirer computer 135 may flag a payment account (identified by a payment token) and an associated merchant computer 130 for fraud/risk level scoring. In another example, a payment token may be used for providing card-linked offers. In another example, the acquirer computer 135 may provide a user transaction report to merchants, the report including transactions that involved a certain payment token.

As shown in FIG. 1, the transaction processing network 140 may be disposed between the acquirer computer 135 and the authorizing entity computer 150. The transaction processing network 140 may include data processing subsystems, networks, and operations used to support and deliver authorization services, exception file services, and clearing and settlement services. For example, the transaction processing network 140 may comprise a server coupled to a network interface (e.g., by an external communication interface), and a databases of information. An exemplary transaction processing network 140 may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The transaction processing network 140 may use any suitable wired or wireless network, including the Internet.

The transaction processing network 140 may be capable of de-tokenizing a token in an authorization request message. For example, the transaction processing network 140 may receive an authorization request message including a payment token, a token code, and/or a domain ID. The transaction processing network 140 may be able to send the received information to the token vault 110, then receive associated payment account information from the token vault 110, and then forward the authorization request message to the authorizing entity computer 150 with the payment account information. The transaction processing network 140 may also receive an authorization response message with the payment account information, and replace some or all of the payment account information with the payment token, token code, and/or domain ID (e.g., via the token vault 110) before forwarding the message to the acquirer computer 135.

In some embodiments, the token vault 110 and the transaction processing network 140 may form a token service system.

The transaction processing network 140, the acquirer computer 135, and the authorizing entity computer 150 may operate suitable routing tables to route authorization request messages using account identifiers such as PANs or tokens. Token routing data may be provided or maintained by the token vault 110, and may be communicated to any of the entities in FIG. 1.

Referring back to FIG. 1, The authorizing entity computer 150 may manage a payment account of the user 120. The authorizing entity computer 150 may be able authorize transactions that involve the payment account.

The token network 145 may also be able to provide de-tokenization services. The token network 145 may include another transaction processing network, another token vault, and/or another token requestor. For example, in some embodiments, the transaction processing network 140 may receive a payment token that is associated the token network 145 instead of the token vault 110. In order to de-tokenize the token for authorization, the transaction processing network 140 may send the token, token code, and/or domain ID to the token network 145, which may then authenticate the information and return the payment credentials. In some embodiments, the token network 145 may wish to de-tokenize a token that is associated with the transaction processing network 140, and may obtain associated payment account information by similarly communicating with the transaction processing network 140 and token vault 110.

Figure 5:
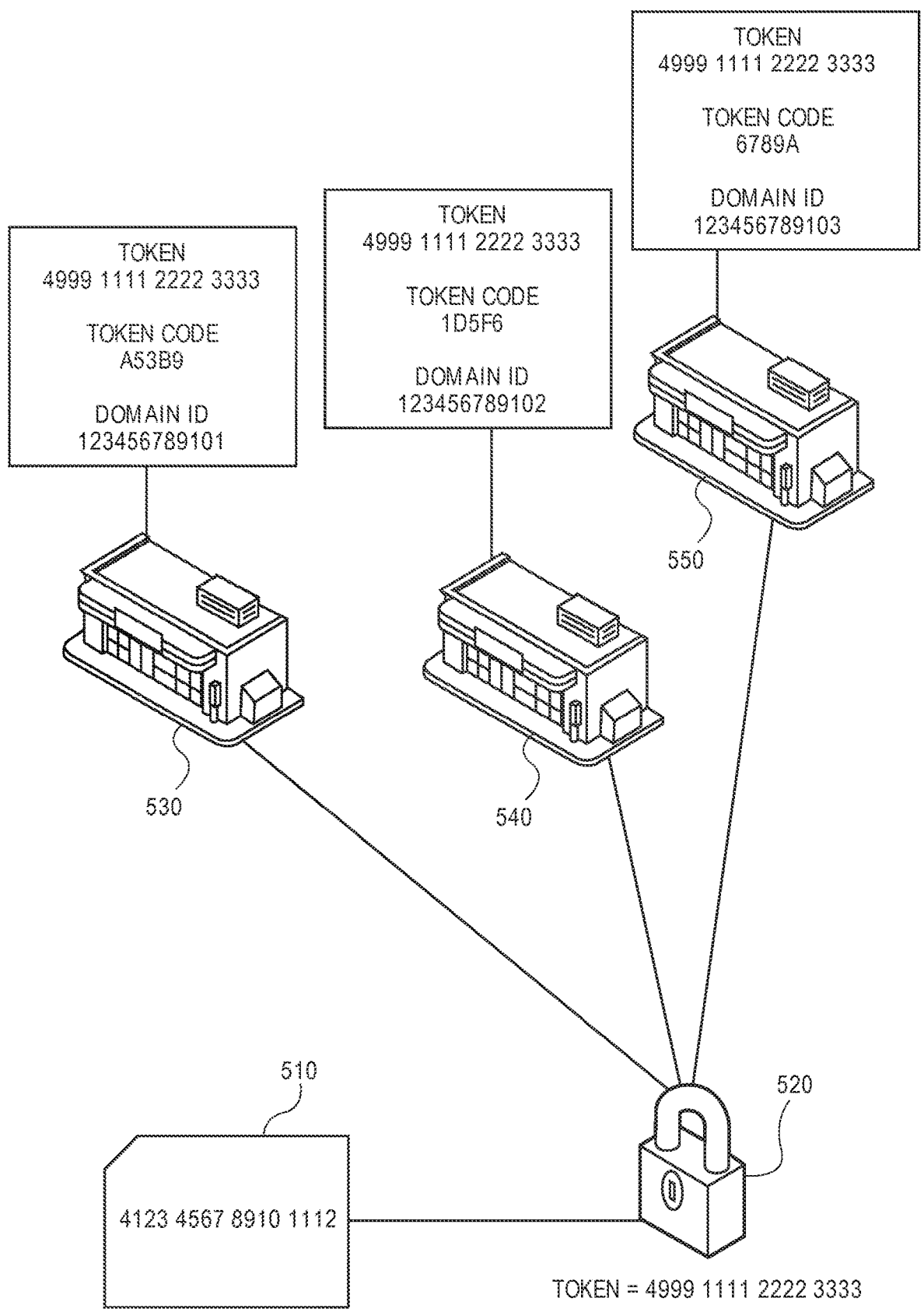
FIG. 5 shows a block diagram illustrating the use of token codes for various domains, in accordance with some embodiments of the invention.

FIG. 5 shows a block diagram illustrating the use of token codes for various domains, in accordance with some embodiments of the invention. FIG. 5 depicts a payment card 510, a payment token 520, and a plurality of merchants (which could be other types of token requestors, in some embodiments), including a first merchant 530, second merchant 540, and third merchant 550. The payment card 510 may be associated with a user and a PAN, e.g., "4123 4567 8910 1112". Each merchant may wish to store payment credentials associated the user. Instead of storing the PAN, the merchant each may request a payment token. A token service provider (e.g., token vault 110) may generate a payment token 520 to be associated with the PAN, as described with respect to FIG. 1. For example, the payment token 520 associated with the PAN could be "4999 1111 2222 3333." Each merchant may receive the payment token 520, and then the payment token 520 may be passed in various authorization request and response messages during a transaction, instead of the PAN. In some embodiments, one or more of the merchants may instead be a mobile device 315. To enable a contactless transactions on the mobile device 315, the user may enroll the payment card 510 with a digital wallet application or payment application on the mobile device 315, and the payment token 520 may be provisioned to the mobile device 315. Also, in some embodiments, the domains can be various acquirers involved in transactions.

As can be seen in FIG. 5, the same payment token 520 can be assigned to each domain (e.g., first domain 530, second domain 540, third domain 550). This may be in contrast to existing implementations in which a different payment token 520 may need to be generated for each separate domain. Each domain may be associated with a domain ID. For example, the first domain 530 may have a domain ID of 123456789101 (also referred to as "101"), the second domain 540 may have a domain ID of 123456789102 (also referred to as "102"), and the third domain 550 may have a domain ID of 123456789103 (also referred to as "103").

In addition to the payment token 520, token codes associated with the payment token may also be generated. A different token code may be assigned to each domain when requesting access to the payment token 520. For example, the first domain 530 may have a token code of "A53B9", the second domain 540 may have a token code of "1D5F6", and the third domain 550 may have a token code of "6789A". A token code may be a shared secret between the domain and the token provider. Accordingly, token codes may be protected by encryption, secure storage, and any other suitable safeguarding. In some embodiments, the token code may also be used in the creation of a cryptogram. Token codes may also be periodically replaced and updated.

The combination of the payment token 520 and a token code may constitute a unique combination. Thus, while each domain may possess the same payment token 520, each domain may possess a unique token code for the payment token 520.

The token code may be a hexadecimal value, although the token code could be any other alphabetical, numeric, or alphanumeric value. In some embodiments, the token code may be indicative of the specific domain for which it was obtained.

The token code may be generated by the same token provider that generated the payment token 520. The holder of the payment token 520 (e.g., merchant, digital wallet application, etc.) may receive and store both the payment token 520 and the token code at the same time. The payment token 520 and the token code may also be updated at any time for a number of reasons, including to prevent a security threat (e.g., fraudulent transactions).

The token code may be specific to the domain so that transaction authentication may occur on the combination of the payment token 520, the token code, and/or the domain ID (along with merchant ID, acquirer BIN/PCR, etc.). Thus, in order for the first merchant 530 to utilize the payment token 520 for a transaction, the first merchant 530 may need to provide the token code "A53B9" and/or the domain ID "101" along with the payment token 520 for the transaction. Then, the token vault 110 can authenticate the payment token 520, the token code "A53B9", and/or the domain ID "101". Further, the token vault 110 can verify that the payment token 520, the token code "A53B9", and/or the domain ID "101" are all associated with one another. The token vault 110 thereby verifies that the first merchant 530 is authorized to utilize the payment token 520. Thus, the payment token 520 may be distributed to multiple entities, but the payment token 520 may only be usable if it is accompanied by an authentic token code and/or domain ID.

For example, the second merchant 540 may be able to use the payment token 520, but the second merchant 540 may need to provide its token code "1D5F6" and its domain ID "102". If a fraudster attempts to use the payment token 520 and provides an illegitimate token code, an illegitimate domain ID, or a mismatching token code and domain ID (e.g., token code "A53B9" and domain ID "103"), the transaction may be rejected as potentially fraudulent.

Accordingly, the domains (e.g., merchants, acquirers, etc.) may be able to have a unique identifier (i.e. the payment token 520) for which to track transactions for risk, fraud, and other analytical metrics. Transactions can be further tracked, divided, analyzed based on the different domain IDs used transactions.

Payment tokens can be a secure replacement for PANs, and may be formatted similarly to PANs. Accordingly, such an implementation would not require a great deal of infrastructure changes on the part of the domains, and may allow for risk and loyalty management on the part of the domains. Since the payment token 520 can be the same across the various domains, less infrastructure change may be required on the part of the domains than would be required for implementations involving providing a unique payment token 520 for each domain.

It can be appreciated that the implementation described with respect to FIG. 5 may allow the use of a single payment token 520 across a plurality of domains. The combination of the single payment token 520 with the great number of possible token codes may allow for a large number of unique combinations. This may be effective for shared BINs.

Additionally, in some embodiments, it may be possible to use token codes in conjunction with a PAN. Instead of introducing the payment token 520, the PAN may be maintained under the condition that a token code should be provided with the PAN. Thus, similar to the payment token 520, the PAN can be widely distributed, but only usable for authorized domains where a token code and/or domain ID have been assigned.

Figure 6:
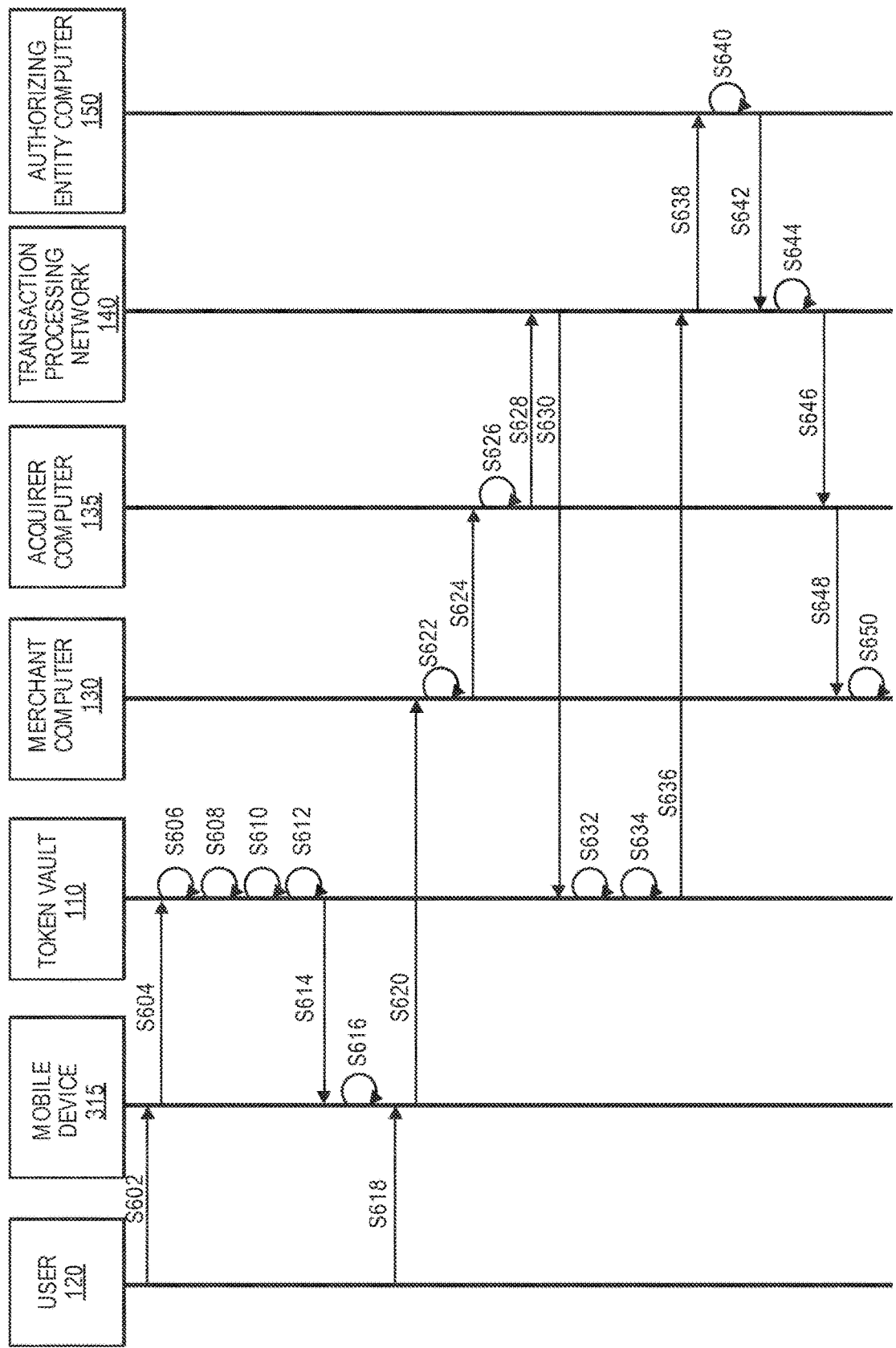
FIG. 6 shows a flow diagram illustrating a method according to embodiments of the invention.

A method 600 according to embodiments of the invention can be described with respect to FIG. 6. Some elements in other Figures are also referred to. The steps shown in the method 600 may be performed sequentially or in any suitable order in embodiments of the invention. In some embodiments, one or more of the steps may be optional.

The various messages in FIG. 6 may use any suitable form of communication. In some embodiments, a request or response may be in an electronic message format, such as an e-mail, a short messaging service (SMS) message, a multimedia messaging service (MMS) message, a hypertext transfer protocol (HTTP) request message, a transmission control protocol (TCP) packet, a web form submission. The request or response may be directed to any suitable location, such as an e-mail address, a telephone number, an internet protocol (IP) address, or a uniform resource locator (URL). In some embodiments, a request or response may comprise a mix of different message types, such as both email and SMS messages.

In the method 600 described below, the mobile device 315 is the token requestor. However, as discussed above, in some embodiments the token requestor may alternatively be a merchant, a third-party token provider, or any other suitable entity.

At step S602, the user 120 may indicate a desire to have payment credentials provisioned onto the mobile device 315. For example, the user 120 may provide a PAN or other suitable payment credentials to the digital wallet application 315J.

At step S604, the mobile device 315 may send a token request to the token vault 110 (e.g., via the token request module 315L). The token request may include the payment credentials (e.g., the PAN, expiration date, etc.). The token request may also include mobile device 315 identifying information, such as the domain ID 315P, and any other suitable information.

At step S606, the token vault 110 may authenticate the mobile device 315. The token vault 110 can check the payment credentials, device ID, etc. Also, the token vault 110 may verify that the domain ID 315P is valid in the token requestor database 110E (e.g., via the authentication module 110G).

At step S608, the token vault 110 may identify a payment token that is associated with the payment credentials in the token database 110C (e.g., via the token identification module 110J). For example, a payment token may already have been generated for the payment credentials for another token requestor. If there is no payment token already associated with the payment credentials, the token vault 110 may generate a payment token, create an association between the payment token and the received payment credentials, and store a record of the payment token in the token database 110C (e.g., via the token generation module 110H).

At step S610, the token vault 110 may generate a token code for the mobile device 315 to use in conjunction with the payment token (e.g., via the token code generation module 110K).

At step S612, the token vault 110 may store a record indicating an association between the token code, the payment token, and the domain ID at the token code database 110D and/or the token database 110C (e.g., via the token code generation module 110K). For example, the token code and domain ID may be added to a list of token codes and domain IDs that are authorized to use the payment token. In another example, the payment token and token code may be added to a list of payment tokens and token codes that the domain ID is authorized to use.

At step S614, the token vault 110 may send a token response to the mobile device 315. The token response may include the payment token, the token code, and/or the domain ID.

At step S616, the mobile device 315 may store the payment token 315N, the token code 315Q, and/or the domain ID 315P (e.g., at the credential storage 315M). This may conclude the token provisioning process, and the mobile device 315 may then be able to utilize the payment token 315N for mobile transactions.

At step S618, the user 120 may initiate a purchase. For example, the user 120 may activate the digital wallet application 315J, and may indicate a desire to make a payment (e.g., by selecting a "payment" option). The user 120 may wish to purchase a good or service at the merchant computer 130 via the mobile device 315. Further, the user 120 may select a payment account within the digital wallet application 315J (e.g., by selecting a visually displayed icon representing a payment account), and present the mobile device 315 to an access device for transmitting the payment information.

At step S620, the mobile device 315 may provide the payment token 315N, the token code 315Q, the domain ID 315P, and/or any other suitable information to the merchant computer 130 for the transaction (e.g., via the payment module 315K). For example, the mobile device 315 may provide the payment information via short-range communication to a merchant access device. The token code 315Q may be encrypted or otherwise protected during transmission, such that only the token vault 110 can decrypt and view the token code 315Q.

At step S622, the merchant computer 130 may analyze the payment token and/or the domain ID. For example, the merchant computer 130 may track user 120 activity based on the payment token, and may use the payment token to perform fraud risk analysis (e.g., check a blacklist and determine transaction velocity), process loyalty-related services, update a user 120 record, and perform any other suitable operations (e.g., via the global analysis module 130H). The merchant computer 130 may not view or utilize the token code, and may simply pass the token code along in the authorization request message.

At step S624, the merchant computer 130 may send an authorization request message to the acquirer computer 135. The authorization request message may include transaction information, the payment token, the token code, the domain ID, and any other suitable information.

At step S626, the acquirer computer 135 may optionally analyze the payment token 315N and/or the domain ID. For example, the acquirer computer 135 may track user 120 activity based on the payment token, and may use the payment token to perform fraud risk analysis (e.g., check a blacklist and determine transaction velocity), process loyalty-related services, update a user 120 record, and perform any other suitable operations. The acquirer computer 135 may not view or utilize the token code, and may simply pass the token code along in the authorization request message.

At step S628, the acquirer computer 135 may forward the authorization request message to the transaction processing network 140.

At step S630, the transaction processing network 140 may determine that a payment token is included in the authorization request message. The transaction processing network 140 may send a de-tokenization request to the token vault 110, the de-tokenization request including the payment token, the token code, the domain ID, and/or any other suitable information.

At step S632, the token vault 110 may authenticate the payment token, the token code, and/or the domain ID (e.g., via the authentication module 110G, the token database 110C, and/or the token code database 110D). For example, the token vault 110 may validate that the payment token, the token code, and/or the domain ID are all associated with one another. The token vault 110 may confirm that the mobile device 315 is authorized to use the payment token. For example, the token vault 110 may confirm that the token code was issued to the mobile device 315 (e.g., it was assigned to the domain ID).

At step S634, the token vault 110 may identify the payment credentials (e.g., the PAN) that are associated with the payment token in the token database 110C (e.g., via the de-tokenization module 110G).

At step S636, the token vault 110 may send a de-tokenization response to the transaction processing network 140, the de-tokenization response including the payment credentials.

At step S638, the transaction processing network 140 may add the payment credentials to the authorization request message and forward the authorization request message to the authorizing entity computer 150. The transaction processing network 140 may optionally remove the payment token, the token code, and/or the domain ID from the authorization request message.

At step S640, the authorizing entity computer 150 then determines whether or not the transaction should be authorized. The authorizing entity computer 150 may check the status of the payment account, conduct any appropriate fraud or credit checks, and perform any other suitable processing in order to determine whether or not to approve of the transaction.

At step S642, the authorizing entity computer 150 then generates and sends an authorization response message back to the transaction processing network 140.

At step S644, the transaction processing network 140 may remove the payment credentials from the authorization response message. The transaction processing network 140 may also reformat the authorization response message to include the payment token, the token code, and/or the domain ID. In some embodiments, the token code may not be included in the authorization response message, as the token code may not be readable or useful to the acquirer computer 135 or merchant computer 130. In some embodiments, the transaction processing network 140 may obtain the payment token, the token code, and/or the domain ID from the token vault 110 in order to include the information in the authorization response message.

At step S646, the transaction processing network 140 may then forward the authorization response message to the acquirer computer 135.

At step S648, the acquirer computer 135 may forward the authorization response message to the merchant computer 130.

At step S650, the merchant computer 130 may release the purchased goods and/or services to the user 120 based on the authorization response message.

At the end of the day or at some other predetermined interval of time, a clearing and settlement process between the authorizing entity computer 150, the transaction processing network 140, and the acquirer computer 135 may occur. In the clearing and settlement process, account information and token exchanges that are similar to those in the above-described authorization processing steps can occur.

Accordingly, it may be possible to replace sensitive payment credentials with the payment token for purchases, but it may still be possible to track user 120 activity based on the payment token, as the payment token can remain static and can be submitted by multiple entities. The security of the payment token can be maintained by incorporating the token code and the domain ID, as the payment token may only be valid if accompanied by a valid token code and domain ID. Thus, with minimal changes to existing systems, payment security is improved without sacrificing the ability to track user 120 activity.

Figure 7:
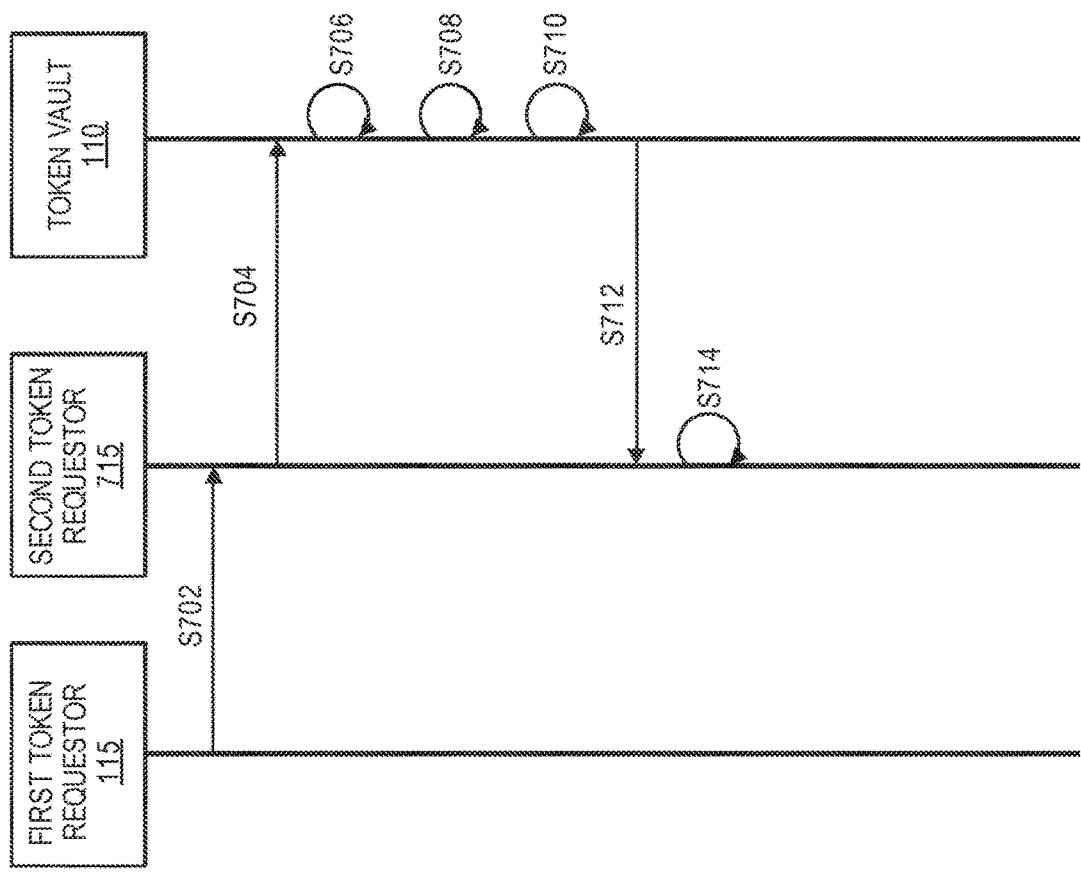
FIG. 7 shows a flow diagram illustrating a method for sharing a token according to embodiments of the invention.

FIG. 7 shows a flow diagram illustrating a method for sharing a token according to embodiments of the invention.

Before describing FIG. 7, it is helpful to discuss why a token might be shared. Merchants and other entities sometimes share user payment credentials. For example, a user may book a hotel room via a hotel reservation website (the first merchant), and the website may forward the user's payment credentials to the hotel (the second merchant). This can allow the hotel to process any room charges and otherwise utilize the user's payment credentials. Also, many merchant systems use payment credentials to generally keep track of a user. For example, instead of generating a new reservation number, the website and/or hotel may use the payment credentials as a unique reservation number. When otherwise communicating about the user, the website and hotel may identify the user by the payment credentials. In addition to business agreements, many other scenarios exist where different payment credential holding entities share the user's payment credentials and track the user by payment credentials.

Accordingly, in payment token systems, token holding entities may want to share payment tokens in the same way that other payment credentials have been shared in the past. However, in typical payment token systems, payment tokens are uniquely assigned to a domain. Only the token holder can use the payment token, so the payment token cannot be functionally shared. If a payment token is used in the wrong domain, the transaction may be rejected. For example, the hotel reservation website may have been provisioned with a payment token associated with a user. The hotel reservation website could send the payment token to the hotel, but the hotel will not be able to use the payment token.

Another problem with typical tokenization systems is that the user can no longer be tracked. In the past, the user could be tracked by a PAN across merchants and acquirers. However, in token systems, there may by multiple payment tokens associated with the same PAN. Accordingly, different merchants and domains cannot identify the user by a single static number, as they have done with the PAN in the past.

Embodiments of the invention solve these problems by using a single payment token. The user can be identified with the single payment token across domains (e.g., merchants and acquirers), similarly to how users have been tracked with a PAN in the past. However, embodiments are more secure than previous systems that shared the PAN, as the single payment token can only be used in authorized domains. If a domain is authorized to use the payment token, it may have a token code and domain ID to prove it.

In some embodiments, token holders/requestors may be able to share payment tokens, as discussed above. However, to maintain security, if a token holder receives a payment token from another token holder, instead of from the token vault, that token holder may need to seek authorization to use the token from the token vault. An example of such a token-sharing process, according to embodiments of the invention, can be described with respect to FIG. 7.

A first token requester 115 may possess a payment token, a first token code, a first domain ID, and any other suitable information associated with a user payment account. The first token requestor 115 may want to share the payment token with a second token requestor 715. The first token requestor 115 and the second token requestor 715 may each be a merchant, mobile device, third-party token provider, or any other suitable entity.

At step S702, the first token requestor 115 may send the payment token to the second token requestor 715. The first token code may be withheld from the second token requestor 715, as it may be a shared secret that is only usable by the first token requestor 115. The first domain ID also be withheld, as it may be an identifier for the first token requestor 115 alone, and it may only be valid for the first token requestor 115.

At step S704, the second token requestor 715 may send a permission request to the token vault 110. The permission request may include the payment token, a second domain ID associated with the second token requestor 715, and any other suitable information. A permission request may differ from a token request in that a permission request includes a payment token, while a token request includes a PAN (or other suitable payment credentials).

At step S706, the token vault 110 may authenticate the second token requestor 715. For example, the token vault 110 may verify that the second domain ID is valid in the token requestor database 110E (e.g., via the authentication module 110G), or otherwise authenticate that the second token requestor 715 is eligible to receive payment tokens. If the second token requestor 715 is not yet registered with the token vault 110 and/or does not have a domain ID, the second token requestor 715 may be prompted to register before a second token code is generated.

At step S708, the token vault 110 may generate a second token code for the second token requestor 715 to use in conjunction with the payment token (e.g., via the token code generation module 110K).

At step S710, the token vault 110 may store a record indicating an association between the second token code, the payment token, and the second domain ID at the token code database 110D and/or the token database 110C (e.g., via the token code generation module 110K). For example, the second token code and the second domain ID may be added to a list of token codes and domain IDs that are authorized to use the payment token. In another example, the payment token and the second token code may be added to a list of payment tokens and token codes that the domain ID is authorized to use.

At step S712, the token vault 110 may send a permission response to the second token requestor 715. The token response may include the payment token, the second token code, and/or the second domain ID.

At step S714, the second token requestor 715 may store the payment token, the second token code, and/or the second domain ID. This may conclude the token provisioning process, and the second token requestor 715 may thereby be granted authorization to utilize the payment token for transactions.

Once the second token requestor 715 receives the payment token from the first token requestor 115, the two entities may be able to use the payment token to identify the user 120 when communicating about the user 120. Further, once the second token requestor 715 has the second token code, the second token requestor 715 may be able to use the payment token to submit charges associated with the user 120.

Embodiments of the invention have a number of advantages. Token proliferation issues are solved, as introducing token codes allows payment tokens to be re-used for multiple domains and transactions. In previous systems, there was a risk that the total number of possible token values would be exhausted, as multiple tokens were being rapidly distributed for single payment accounts. In contrast, token codes allow single payment tokens to be safely distributed to multiple token holders. In some embodiments, token codes can effectively serve to differentiate a single payment token into multiple unique (payment token+token code) pairs. Also, because introducing token codes reduces the amount of unique payment tokens needed, it may be easier to divide limited token BIN space among smaller issuers.

Additionally, embodiments allow tokens to be introduced without interrupting the user-activity tracking programs of several entities (e.g., acquirers, merchants). Entities that previously tracked a user's payment account activity based on a PAN can continue to track user activity based on a similarly formatted payment token that may now be present in each transaction involving the payment account.

Further, payment security can be increased. Instead of exposing sensitive payment credentials (e.g., a PAN), a payment token can be used. In some embodiments, additional authentication takes places when the payment token is used for a transaction. For example, a valid token code and corresponding domain ID may need be provided with the payment token. Token codes and domain IDs may only be available to registered token requestors. Thus, the entity submitting the payment token can be identified, and a shared secret (i.e., the token code) may protect the payment token from being fraudulently used. Additionally, payment tokens, token codes, and domain IDs can be refreshed periodically.

Another advantage in embodiments is that the system may be relatively easy to adopt. Merchants, acquirers, and other involved entities may be able to engage in the token system by simply passing along a token code and/or domain ID in an authorization message. Applications that previously relied on a PAN, such as loyalty, merchant-to-merchant communication, and other user tracking applications, may still function by utilizing the payment token (which may appear similar to the PAN). The token vault may be able to orchestrate issuing, authentication, and maintenance of payment tokens, token codes, and domain IDs such that other entities are not burdened. Also, in some embodiments, current authorization message formats may be able to accommodate the addition of the token code and/or domain ID without needing to add new fields or otherwise change the format of the messages. Thus, embodiments may provide an easy transition from traditional payment systems into token systems.

Figure 8:
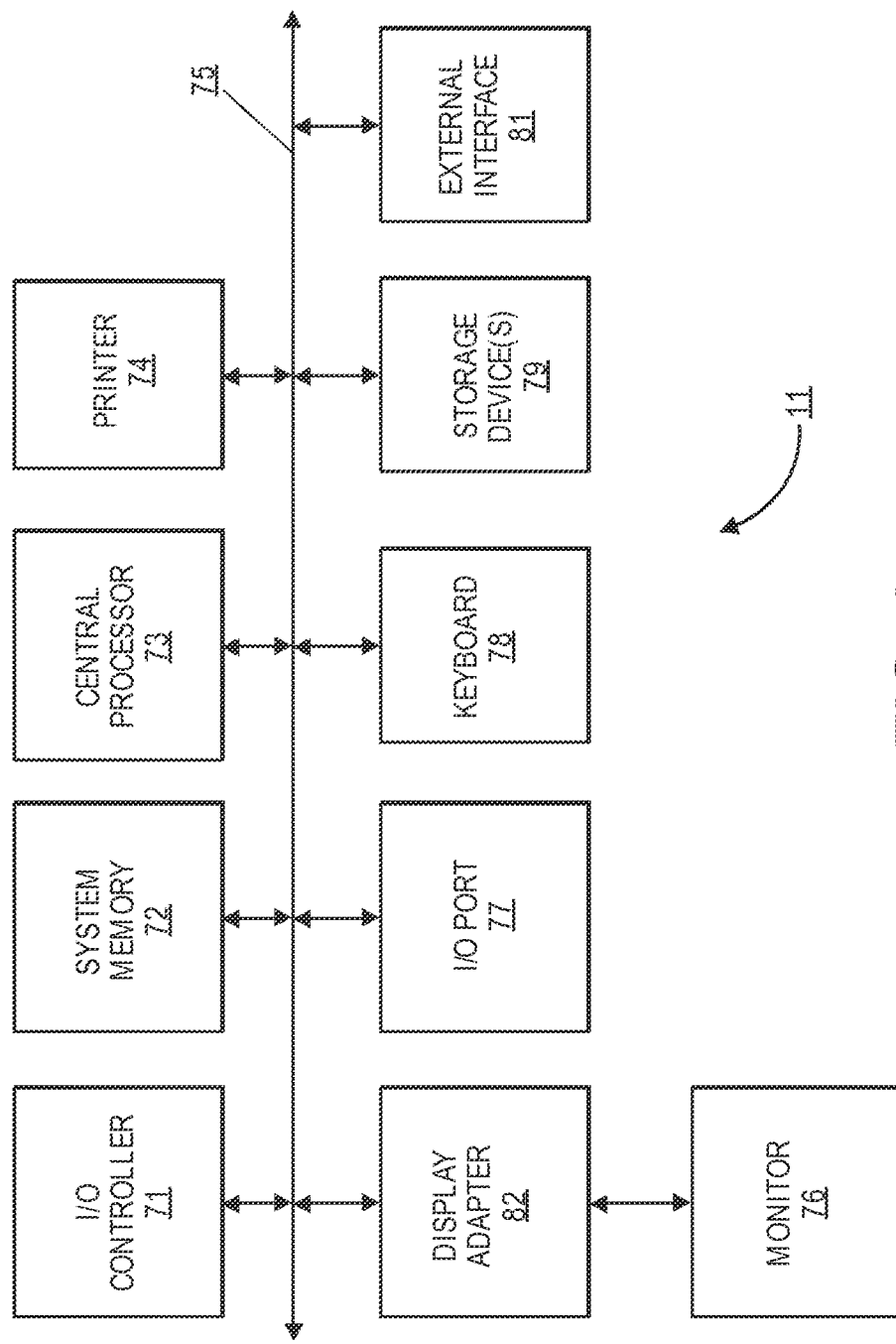
FIG. 8 shows a block diagram of a computer apparatus according to an embodiment of the invention.

FIG. 8 is a high-level block diagram 11 of a computer system that may be used to implement any of the entities or components described above. The subsystems shown in FIG. 8 are interconnected via a system bus 75. Additional subsystems include a printer 74, keyboard 78, storage device 79, and monitor 76, which is coupled to display adapter 82. Peripherals and input/output (I/O) devices, which couple to I/O controller 71, can be connected to the computer system by any number of means known in the art, such as a serial port. For example, I/O port 77 or external interface 81 can be used to connect the computer apparatus to a wide area network such as the Internet, a mouse input device, or a scanner. The interconnection via system bus 75 allows the central processor 73 to communicate with each subsystem and to control the execution of instructions from system memory 72 or the storage device 79, as well as the exchange of information between subsystems. The system memory 72 and/or the storage device may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
receiving, by a processor in a token service computer, a first token request including a payment account number and a first domain identifier;
identifying or generating, by the processor in the token service computer, a payment token associated with the payment account number;
generating, by the processor in the token service computer, a first token code associated with the payment token;
assigning, by the processor in the token service computer, the payment token and the first token code to the first domain identifier, such that the first token code is specific to a first token domain associated with the first domain identifier;
providing, by the processor in the token service computer, the payment token and the first token code, wherein the payment token is subsequently used in place of the payment account number for a first payment transaction, wherein the payment token is valid for the first payment transaction if the payment token is accompanied by the first token code and used within the first token domain, the payment account number is identified based on the payment token for the first payment transaction, and the first payment transaction is authorized based on the identified payment account number;
receiving, by the processor in the token service computer, a second token request including the payment account number or the payment token and further including a second domain identifier;
generating, by the processor in the token service computer, a second token code associated with the payment token, wherein the second token code is different than the first token code;
assigning, by the processor in the token service computer, the payment token and the second token code to the second domain identifier, such that the second token code is specific to a second token domain associated with the second domain identifier, wherein the first domain identifier is different than the second domain identifier, and wherein the first token domain is different than the second token domain; and
providing, by the processor in the token service computer, the second token code, wherein the payment token is subsequently used in place of the payment account number for a second payment transaction, the payment token is valid for the second payment transaction if the payment token is accompanied by the second token code and used within the second token domain, the payment account number is identified based on the payment token for the second payment transaction, and the second payment transaction is authorized based on the identified payment account number, wherein the same payment token is used for both the first payment transaction and the second payment transaction, the same payment token is associated with both the second token code and the first token code, and the same payment token is usable within both the first token domain and the second token domain.

2. The method of claim 1, wherein the first token request is received from a first token requestor computer, the payment token and the first token code are provided to the first token requestor computer, the second token request is received from a second token requestor computer, and the second token code is provided to the second token requestor computer.

3. The method of claim 2, wherein the second token request includes the payment token and not the payment account number, and wherein the second token requestor computer initially received the payment token from the first token requestor computer.

4. The method of claim 2, wherein the first token requestor computer is a mobile device, the mobile device is associated with a user, the payment account number is associated with the user, the first domain identifier is associated with the mobile device, the first token domain includes transactions associated with the mobile device, and the payment token is valid for the first payment transaction if the first payment transaction is initiated by the mobile device.

5. The method of claim 2, wherein the first token domain includes usage by the first token requestor computer and the second token domain includes usage by the second token requestor computer, wherein the payment token is valid for the first payment transaction if the first payment transaction is initiated by the first token requestor computer, and wherein the payment token is valid for the second payment transaction if the second payment transaction is initiated by the second token requestor computer.

6. The method of claim 1, wherein the first token request is received from a first token requestor computer, the payment token and the first token code are provided to the first token requestor computer, the second token request is received from the first token requestor computer, and the second token code is provided to the first token requestor computer.

7. The method of claim 1, further comprising:
receiving, by the processor in the token service computer, a first payment account number request from a transaction processing network computer, the first payment account number request including the payment token, the first token code, and the first domain identifier;
determining, by the processor in the token service computer, that the first token code is associated with the payment token;
determining, by the processor in the token service computer, that the payment token and the first token code are assigned to the first domain identifier;
identifying, by the processor in the token service computer, the payment account number associated with the payment token;
sending, by the processor in the token service computer, a first payment account number response including the payment account number to the transaction processing network computer;
receiving, by the processor in the token service computer, a second payment account number request from the transaction processing network computer, the second payment account number request including the payment token, the second token code, and the second domain identifier;
determining, by the processor in the token service computer, that the second token code is associated with the payment token;
determining, by the processor in the token service computer, that the payment token and the second token code are assigned to the second domain identifier;
identifying, by the processor in the token service computer, the payment account number associated with the payment token; and
sending, by the processor in the token service computer, a second payment account number response including the payment account number to the transaction processing network computer.

8. The method of claim 1, wherein the first token code is a first hexadecimal value and the second token code is a second hexadecimal value.

9. The method of claim 1, wherein the first token domain includes a first circumstance in which the payment token can be used, and the second token domain includes a second circumstance in which the payment token can be used.

10. The method of claim 1, wherein the first token request is received from a first token requestor computer, the payment token and the first token code are provided to the first token requestor computer, the first token requestor computer is a mobile device, the first token domain includes transactions conducted by the mobile device, and the payment token is valid for the first payment transaction if the first payment transaction is conducted by the mobile device.

11. The method of claim 10, wherein the first token domain includes a first payment channel being in-person transactions conducted by the mobile device, and the payment token is valid for the first payment transaction if the first payment transaction is an in-person transaction conducted by the mobile device, the second token request is received from the mobile device, the second token code is provided to the mobile device, the second token domain includes a second payment channel being e-commerce transactions conducted by the mobile device, the payment token is valid for the second payment transaction if the second payment transaction is an-ecommerce transaction conducted by the mobile device, the first token domain and the second token domain both include the same mobile device, and the first token domain and the second token domain include different payment channels.

12. The method of claim 1, wherein the first token domain is uniquely associated with a single device, and the payment token is valid for the first payment transaction only if the first payment transaction is conducted by the single device.

13. The method of claim 1, wherein the first token request is received from a first token requestor, the payment token and the first token code are provided to the first token requestor, the first token domain is uniquely associated with the first token requestor, the payment token is valid for the first payment transaction only if the first payment transaction is conducted by the first token requestor, and the first token code remains valid for subsequent payment transactions after the first payment transaction.

14. The method of claim 1, wherein the first token request is received from a first token requestor computer, the payment token and the first token code are provided to the first token requestor computer, the second token request is received from a second token requestor computer, the second token code is provided to the second token requestor computer, the first token domain includes usage by the first token requestor computer and the second token domain includes usage by the second token requestor computer, wherein the payment token is valid for the first payment transaction if the first payment transaction is initiated by the first token requestor computer, and the payment token is valid for the second payment transaction if the second payment transaction is initiated by the second token requestor computer, the first token requestor computer is a first device, and the second token requestor computer is a second device.

15. The method of claim 1, wherein the payment token is a substitute for the payment account number, the first token request is received from a first token requestor computer, the payment token and the first token code are provided to the first token requestor computer, the first token requestor computer stores the payment token and the first token code, the second token request is received from a second token requestor computer, the second token code is provided to the second token requestor computer, and the second token requestor computer stores the payment token and the second token code.

16. A token service computer comprising:
a processor; and
a non-transitory computer readable medium, the non-transitory computer readable medium comprising code, executable by the processor, for implementing a method comprising:
receiving a first token request including a payment account number and a first domain identifier;
identifying or generating a payment token associated with the payment account number;
generating a first token code associated with the payment token;
assigning the payment token and the first token code to the first domain identifier, such that the first token code is specific to a first token domain associated with the first domain identifier;
providing the payment token and the first token code, wherein the payment token is subsequently used in place of the payment account number for a first payment transaction, wherein the payment token is valid for the first payment transaction if the payment token is accompanied by the first token code and used within the first token domain, the payment account number is identified based on the payment token for the first payment transaction, and the first payment transaction is authorized based on the identified payment account number;

receiving a second token request including the payment account number or the payment token and further including a second domain identifier;

generating a second token code associated with the payment token, wherein the second token code is different than the first token code;

assigning the payment token and the second token code to the second domain identifier, such that the second token code is specific to a second token domain associated with the second domain identifier, wherein the first domain identifier is different than the second domain identifier, and wherein the first token domain is different than the second token domain; and providing the second token code, wherein the payment token is subsequently used in place of the payment account number for a second payment transaction, the payment token is valid for the second payment transaction if the payment token is accompanied by the second token code and used within the second token domain, the payment account number is identified based on the payment token for the second payment transaction, and the second payment transaction is authorized based on the identified payment account number, wherein the same payment token is used for both the first payment transaction and the second payment transaction, the same payment token is associated with both the second token code and the first token code, and the same payment token is usable within both the first token domain and the second token domain.

17. A method comprising:

receiving, by a transaction processing network computer, a first authorization request message for a first payment transaction, the first authorization request message including a payment token, a first token code that is specific to a first token domain associated with a first domain identifier, and the first domain identifier;

sending, by the transaction processing network computer, a first payment account number request to a token service computer, the first payment account number request including the payment token, the first token code, and the first domain identifier, wherein the token service computer determines that the first token code is associated with the payment token, determines that the payment token and the first token code are assigned to the first domain identifier, and identifies a payment account number associated with the payment token;

receiving, by the transaction processing network computer, a first payment account number response including the payment account number associated with the payment token from the token service computer;

adding, by the transaction processing network computer, the payment account number to the first authorization request message;

sending, by the transaction processing network computer, the first authorization request message to an authorizing entity computer, wherein the first payment transaction is authorized based on the payment account number included in the first authorization request message;

receiving, by the transaction processing network computer, a second authorization request message for a second payment transaction, the second authorization request message including the payment token, a second token code that is specific to a second token domain associated with a second domain identifier, and the second domain identifier, wherein the second token code is different than the first token code, the first domain identifier is different than the second domain identifier, and the first token domain is different than the second token domain;

sending, by the transaction processing network computer, a second payment account number request to the token service computer, the second payment account number request including the payment token, the second token code, and the second domain identifier, wherein the token service computer determines that the second token code is associated with the payment token, determines that the payment token and the second token code are assigned to the second domain identifier, and identifies the payment account number associated with the payment token;

receiving, by the transaction processing network computer, a second payment account number response including the payment account number associated with the payment token from the token service computer;

adding, by the transaction processing network computer, the payment account number to the second authorization request message; and sending, by the transaction processing network computer, the second authorization request message to the authorizing entity computer, wherein the second payment transaction is authorized based on the payment account number included in the second authorization request message, wherein the same payment token is used for both the first payment transaction and the second payment transaction, the same payment token is associated with both the second token code and the first token code, and the same payment token is usable within both the first token domain and the second token domain.

18. The method of claim 17, further comprising:

receiving, by the transaction processing network computer, a first authorization response message including the payment account number from the authorizing entity computer;

replacing, by the transaction processing network computer, the payment account number with at least the payment token in the first authorization response message;

forwarding, by the transaction processing network computer, the first authorization response message;

receiving, by the transaction processing network computer, a second authorization response message including the payment account number from the authorizing entity computer;

replacing, by the transaction processing network computer, the payment account number with at least the payment token in the second authorization response message; and forwarding, by the transaction processing network computer, the second authorization response message.

19. The method of claim 17, wherein the first token domain includes a first circumstance in which the payment token can be used, and wherein the second token domain includes a second circumstance in which the payment token can be used.

20. The method of claim 19, wherein the first circumstance is usage by a first token requestor and the second circumstance is usage by a second token requestor.

\* \* \* \* \*